US006786041B2

(12) United States Patent
Itoh et al.

(10) Patent No.: US 6,786,041 B2
(45) Date of Patent: Sep. 7, 2004

(54) EXHAUST GAS PURIFICATION METHOD AND EXHAUST GAS PURIFICATION APPARATUS

(75) Inventors: Kazuhiro Itoh, Mishima (JP); Toshiaki Tanaka, Numazu (JP); Shinya Hirota, Susono (JP); Koichi Kimura, Susono (JP); Koichiro Nakatani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 09/958,597

(22) PCT Filed: Feb. 15, 2001

(86) PCT No.: PCT/JP01/01098

§ 371 (c)(1),
(2), (4) Date: Oct. 11, 2001

(87) PCT Pub. No.: WO01/61159

PCT Pub. Date: Aug. 23, 2001

(65) Prior Publication Data

US 2002/0155039 A1 Oct. 24, 2002

(30) Foreign Application Priority Data

Feb. 16, 2000 (JP) ....................................... 2000-043571
Mar. 23, 2000 (JP) ....................................... 2000-082959

(51) Int. Cl.[7] ............................ B01D 49/00; F01N 3/00

(52) U.S. Cl. ............................ 60/274; 60/282; 60/297; 422/177; 423/212; 423/213.2; 423/213.5; 423/215.5

(58) Field of Search ........................... 423/213.2, 213.5, 423/215.5, 239.1, 212; 60/274, 297, 282; 422/177

(56) References Cited

U.S. PATENT DOCUMENTS

| | | | | | |
|---|---|---|---|---|---|
| 4,319,896 | A | * | 3/1982 | Sweeney | 55/213 |
| 4,510,265 | A | * | 4/1985 | Hartwig | 423/215.5 |
| 4,881,369 | A | | 11/1989 | Kanesaki | 60/285 |
| 4,902,487 | A | | 2/1990 | Cooper et al. | 423/215.5 |
| 4,912,076 | A | * | 3/1990 | Mizrah et al. | 502/300 |
| 4,914,065 | A | * | 4/1990 | Hijikata et al. | 502/52 |
| 5,100,632 | A | * | 3/1992 | Dettling et al. | 423/213.5 |
| 5,259,190 | A | * | 11/1993 | Bagley et al. | 422/174 |
| 6,235,254 | B1 | * | 5/2001 | Murphy et al. | 423/210 |
| 6,245,306 | B1 | * | 6/2001 | Miyazaki et al. | 423/215.5 |
| 6,287,527 | B1 | * | 9/2001 | Kawanami et al. | 423/213.2 |
| 2003/0072702 | A1 | * | 4/2003 | Itoh et al. | 423/215.5 |

FOREIGN PATENT DOCUMENTS

| | | | | |
|---|---|---|---|---|
| DE | 42 43 003 A1 | * | 6/1994 | 423/245.3 |
| EP | 0 766 993 A2 | | 4/1997 | |
| JP | A 6026017 | | 10/1985 | |
| JP | U 62-190841 | | 12/1987 | |
| JP | A 5-214923 | | 8/1993 | |
| JP | A 6-159037 | | 6/1994 | |
| JP | A 6-272541 | | 9/1994 | |
| JP | A 7-189656 | | 7/1995 | |
| JP | A 7-106290 | | 11/1995 | |

(List continued on next page.)

*Primary Examiner*—Wayne A. Langel
(74) *Attorney, Agent, or Firm*—Oliff & Berridge, PLLC

(57) ABSTRACT

A particulate filter (22) is arranged in an exhaust passage of an engine. When an amount of discharged particulate discharged from a combustion chamber (5) per unit time exceeds an amount of particulate removable by oxidation which can be removed by oxidation on the particulate filter (22) per unit time without emitting a luminous flame, at least one of the amount of discharged particulate and the amount of particulate removable by oxidation is controlled so that the amount of discharged particulate becomes smaller than the amount of particulate removable by oxidation, whereby the particulate in the exhaust gas can be continuously removed by oxidation on the particulate filter (22) without emitting a luminous flame.

39 Claims, 21 Drawing Sheets

FOREIGN PATENT DOCUMENTS

| | | | | |
|---|---|---|---|---|
| JP | A 8-338229 | | 12/1996 | |
| JP | A 9-94434 | | 4/1997 | |
| JP | A 10-306717 | | 11/1998 | |
| JP | A 11-36923 | | 2/1999 | |
| JP | A 11-300165 | | 11/1999 | |
| JP | B2 3012249 | | 12/1999 | |
| WO | 89/09648 | * | 10/1989 | ............. 423/215.5 |

* cited by examiner

TF=200°C

TF=250°C

TF=300°C

TF=350°C

TF=400°C

TF=450°C

EXHAUST GAS PURIFICATION METHOD AND EXHAUST GAS PURIFICATION APPARATUS

TECHNICAL FIELD

The present invention relates to an exhaust gas purification method and an exhaust gas purification apparatus.

BACKGROUND ART

In the past, in a diesel engine, particulate contained in the exhaust gas has been removed by arranging a particulate filter in the engine exhaust passage, using that particulate filter to trap the particulate in the exhaust gas, and igniting and burning the particulate trapped on the particulate filter to regenerate the particulate filter. The particulate trapped on the particulate filter, however, does not ignite unless the temperature becomes a high one of at least about 600° C. As opposed to this, the temperature of the exhaust gas of a diesel engine is normally considerably lower than 600° C. Therefore, it is difficult to use the heat of the exhaust gas to cause the particulate trapped on the particulate filter to ignite. To use the heat of the exhaust gas to cause the particulate trapped on the particulate filter to ignite, it is necessary to lower the ignition temperature of the particulate.

It has been known in the past, however, that the ignition temperature of particulate can be reduced if carrying a catalyst on the particulate filter. Therefore, known in the art are various particulate filters carrying catalysts for reducing the ignition temperature of the particulate.

For example, Japanese Examined Patent Publication (Kokoku) No. 7-106290 discloses a particulate filter comprising a particulate filter carrying a mixture of a platinum group metal and an alkali earth metal oxide. In this particulate filter, the particulate is ignited by a relatively low temperature of about 350° C. to 400° C., then is continuously burned.

In a diesel engine, when the load becomes high, the temperature of the exhaust gas reaches from 350° C. to 400° C., therefore with the above particulate filter, it would appear at first glance that the particulate could be made to ignite and burn by the heat of the exhaust gas when the engine load becomes high. In fact, however, even if the temperature of the exhaust gas reaches from 350° C. to 400° C., sometimes the particulate will not ignite. Further, even if the particulate ignites, only some of the particulate will burn and a large amount of the particulate will remain unburned.

That is, when the amount of the particulate contained in the exhaust gas is small, the amount of the particulate deposited on the particulate filter is small. At this time, if the temperature of the exhaust gas reaches from 350° C. to 400° C., the particulate on the particulate filter ignites and then is continuously burned.

If the amount of the particulate contained in the exhaust gas becomes larger, however, before the particulate deposited on the particulate filter completely burns, other particulate will deposit on that particulate. As a result, the particulate deposits in layers on the particulate filter. If the particulate deposits in layers on the particulate filter in this way, the part of the particulate easily contacting the oxygen will be burned, but the remaining particulate hard to contact the oxygen will not burn and therefore a large amount of particulate will remain unburned. Therefore, if the amount of particulate contained in the exhaust gas becomes larger, a large amount of particulate continues to deposit on the particulate filter.

On the other hand, if a large amount of particulate is deposited on the particulate filter, the deposited particulate gradually becomes harder to ignite and burn. It probably becomes harder to burn in this way because the carbon in the particulate changes to the hard-to-burn graphite etc. while depositing. In fact, if a large amount of particulate continues to deposit on the particulate filter, the deposited particulate will not ignite at a low temperature of 350° C. to 400° C. A high temperature of over 600° C. is required for causing ignition of the deposited particulate. In a diesel engine, however, the temperature of the exhaust gas usually never becomes a high temperature of over 600° C. Therefore, if a large amount of particulate continues to deposit on the particulate filter, it is difficult to cause ignition of the deposited particulate by the heat of the exhaust gas.

On the other hand, at this time, if it were possible to make the temperature of the exhaust gas a high temperature of over 600° C., the deposited particulate would be ignited, but another problem would occur in this case. That is, in this case, if the deposited particulate were made to ignite, it would burn while generating a luminous flame. At this time, the temperature of the particulate filter would be maintained at over 800° C. for a long time until the deposited particulate finished being burned. If the particulate filter is exposed to a high temperature of over 800° C. for a long time in this way, however, the particulate filter will deteriorate quickly and therefore the problem will arise of the particulate filter having to be replaced with a new filter early.

Further, if the deposited particulate is burned, the ash will condense and form large masses. These masses of ash clog the fine holes of the particulate filter. The number of the clogged fine holes gradually increases along with the elapse of time and therefore the pressure loss of the flow of exhaust gas in the particulate filter gradually becomes larger. If the pressure loss of the flow of exhaust gas becomes larger, the output of the engine falls and therefore due to this as well a problem arises that the particulate filter has to be replaced quickly with a new filter.

If a large amount of particulate deposits once in layers in this way, various problems arise as explained above. Therefore, it is necessary to prevent a large amount of particulate from depositing in layers while considering the balance between the amount of particulate contained in the exhaust gas and the amount of particulate able to be burned on the particulate filter. With the particulate filter disclosed in the above publication, however, no consideration is given at all to the balance between the amount of particulate contained in the exhaust gas and the amount of particulate able to be burned on the particulate filter and therefore various problems arise as explained above.

Further, with the particulate filter disclosed in the above publication, if the temperature of the exhaust gas falls below 350° C., the particulate will not ignite and therefore the particulate will deposit on the particulate filter. In this case, if the amount of deposition is small, when the temperature of the exhaust gas reaches from 350° C. to 400° C., the deposited particulate will be burned, but if a large amount of particulate deposits in layers, the deposited particulate will not ignite when the temperature of the exhaust gas reaches from 350° C. to 400° C. Even if it does ignite, part of the particulate will not burn, so will remain unburned.

In this case, if the temperature of the exhaust gas is raised before the large amount of particulate deposits in layers, it is possible to make the deposited particulate burn without leaving any, but with the particulate filter disclosed in the above publication, this is not considered at all. Therefore, when a large amount of particulate deposits in layers, so far as the temperature of the exhaust gas is not raised to over 600° C., all of the deposited particulate cannot be made to burn.

DISCLOSURE OF THE INVENTION

An object of the present invention is to provide an exhaust gas purification method and exhaust gas purification apparatus able to continuously remove by oxidation the particulate in exhaust gas on a particulate filter.

Another object of the present invention is to provide an exhaust gas purification method and exhaust gas purification apparatus able to continuously remove by oxidation the particulate in exhaust gas on a particulate filter and simultaneously remove $NO_x$ in the exhaust gas.

According to the present invention, there is provided an exhaust gas purification method using as a particulate filter for removing particulate in exhaust gas discharged from a combustion chamber a particulate filter able to remove by oxidation any particulate in exhaust gas flowing into the particulate filter without emitting a luminous flame when an amount of the discharged particulate discharged from the combustion chamber per unit time is smaller than an amount of particulate removable by oxidation able to be removed by oxidation on the particulate filter per unit time without emitting a luminous flame and controlling at least one of the amount of discharged particulate or the amount of particulate removable by oxidation so that said amount of discharged particulate becomes less than said amount of particulate removable by oxidation when the amount of discharged particulate exceeds the amount of particulate removable by oxidation.

According to the present invention, there is provided an exhaust gas purification apparatus arranging in an engine exhaust passage a particulate filter for removing particulate in exhaust gas discharged from a combustion chamber, using as the particulate filter a particulate filter able to remove by oxidation any particulate in exhaust gas flowing into the particulate filter without emitting a luminous flame when an amount of the discharged particulate discharged from the combustion chamber per unit time is smaller than an amount of particulate removable by oxidation able to be removed by oxidation on the particulate filter per unit time without emitting a luminous flame, and provided with control means for controlling at least one of the amount of discharged particulate or the amount of particulate removable by oxidation so that said amount of discharged particulate becomes less than said amount of particulate removable by oxidation when the amount of discharged particulate exceeds the amount of particulate removable by oxidation.

Further, according to the present invention, there is provided an exhaust gas purification method using as a particulate filter for removing particulate in exhaust gas discharged from a combustion chamber a particulate filter able to remove by oxidation any particulate in exhaust gas flowing into the particulate filter without emitting a luminous flame when an amount of the discharged particulate discharged from the combustion chamber per unit time is smaller than an amount of particulate removable by oxidation able to be removed by oxidation on the particulate filter per unit time without emitting a luminous flame and having a function of absorbing $NO_x$ in the exhaust gas when an air-fuel ratio of the exhaust gas flowing into the particulate filter is lean and releasing the absorbed $NO_x$ when the air-fuel ratio of the exhaust gas flowing into the particulate filter becomes the stoichiometric air-fuel ratio or rich and controlling at least one of the amount of discharged particulate or the amount of particulate removable by oxidation so that said amount of discharged particulate becomes less than said amount of particulate removable by oxidation when the amount of discharged particulate exceeds the amount of particulate removable by oxidation.

Further, according to the present invention, there is provided an exhaust gas purification apparatus arranging in an engine exhaust passage a particulate filter for removing particulate in exhaust gas discharged from a combustion chamber, using as the particulate filter a particulate filter able to remove by oxidation any particulate in exhaust gas flowing into the particulate filter without emitting a luminous flame when an amount of the discharged particulate discharged from the combustion chamber per unit time is smaller than an amount of particulate removable by oxidation able to be removed by oxidation on the particulate filter per unit time without emitting a luminous flame and having a function of absorbing $NO_x$ in the exhaust gas when an air-fuel ratio of the exhaust gas flowing into the particulate filter is lean and releasing the absorbed $NO_x$ when the air-fuel ratio of the exhaust gas flowing into the particulate filter becomes the stoichiometric air-fuel ratio or rich, and provided with control means for controlling at least one of the amount of discharged particulate or the amount of particulate removable by oxidation so that said amount of discharged particulate becomes less than said amount of particulate removable by oxidation when the amount of discharged particulate exceeds the amount of particulate removable by oxidation.

BEST MODE FOR CARRYING OUT THE INVENTION

Figure 1:
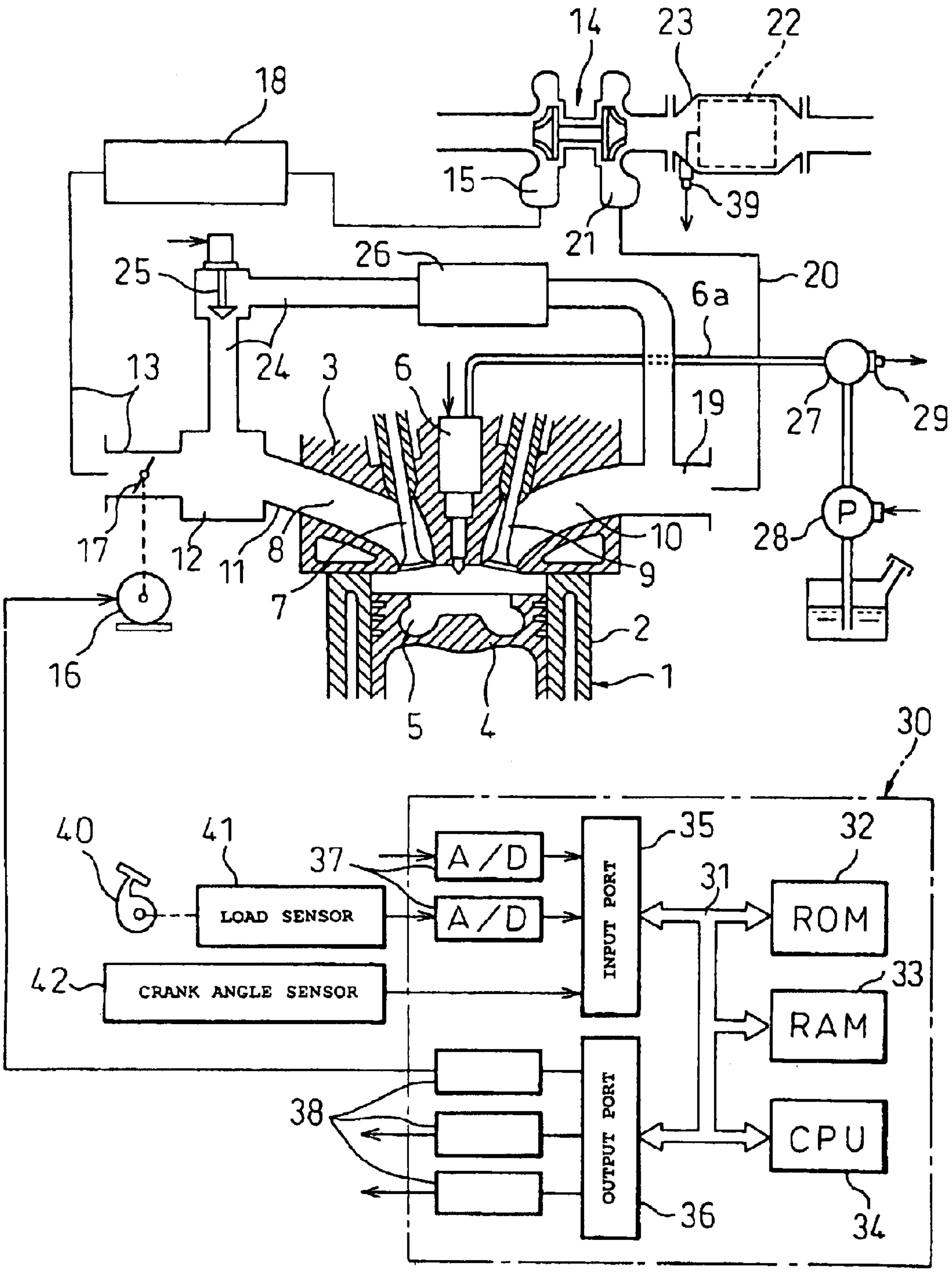
FIG. 1 is an overall view of an internal combustion engine.

FIG. 1 shows the case of application of the present invention to a compression ignition type internal combustion engine. Note that the present invention can also be applied to a spark ignition type internal combustion engine.

Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected to a compressor 15 of an exhaust turbocharger 14 through an intake duct 13. Inside the intake duct 13 is arranged a throttle valve 17 driven by a step motor 16. Further, a cooling device 18 is arranged around the intake duct 13 for cooling the intake air flowing through the intake duct 13. In the embodiment shown in FIG. 1, the engine coolant water is led inside the cooling device 18 and the intake air is cooled by the engine coolant water. On the other hand, the exhaust port 10 is connected to an exhaust turbine 21 of an exhaust turbocharger 14 through an exhaust manifold 19 and an exhaust pipe 20. The outlet of the exhaust turbine 21 is connected to a casing 23 housing a particulate filter 22.

The exhaust manifold 19 and the surge tank 12 are connected to each other through an exhaust gas recirculation (EGR) passage 24. Inside the EGR passage 24 is arranged an electrically controlled EGR control valve 25. A cooling device 26 is arranged around the EGR passage 24 to cool the EGR gas circulating inside the EGR passage 24. In the embodiment shown in FIG. 1, the engine coolant water is guided inside the cooling device 26 and the EGR gas is cooled by the engine coolant water. On the other hand, fuel injectors 6 are connected to a fuel reservoir, a so-called common rail 27, through fuel feed pipes 6*a*. Fuel is fed into the common rail 27 from an electrically controlled variable discharge fuel pump 28. The fuel fed into the common rail 27 is fed to the fuel injectors 6 through the fuel feed pipes 6*a*. The common rail 27 has a fuel pressure sensor 29 attached to it for detecting the fuel pressure in the common rail 27. The discharge of the fuel pump 28 is controlled based on the output signal of the fuel pressure sensor 29 so that the fuel pressure in the common rail 27 becomes a target fuel pressure.

An electronic control unit 30 is comprised of a digital computer provided with a ROM (read only memory) 32, RAM (random access memory) 33, CPU (microprocessor) 34, input port 35, and output port 36 connected to each other through a bidirectional bus 31. The output signal of the fuel pressure sensor 29 is input through a corresponding AD converter 37 to the input port 35. Further, the particulate filter 22 has attached to it a temperature sensor 39 for detecting the particulate filter 22. The output signal of this temperature sensor 39 is input to the input port 35 through the corresponding AD converter 37. An accelerator pedal 40 has connected to it a load sensor 41 generating an output voltage proportional to the amount of depression L of the accelerator pedal 40. The output voltage of the load sensor 41 is input to the input port 35 through the corresponding AD converter 37. Further, the input port 35 has connected to it a crank angle sensor 42 generating an output pulse each time a crankshaft rotates by for example 30 degrees. On the other hand, the output port 36 is connected through corresponding drive circuits 38 to the fuel injectors 6, the step motor 16 for driving the throttle valve, the EGR control valve 25, and the fuel pump 28.

Figure 2A:
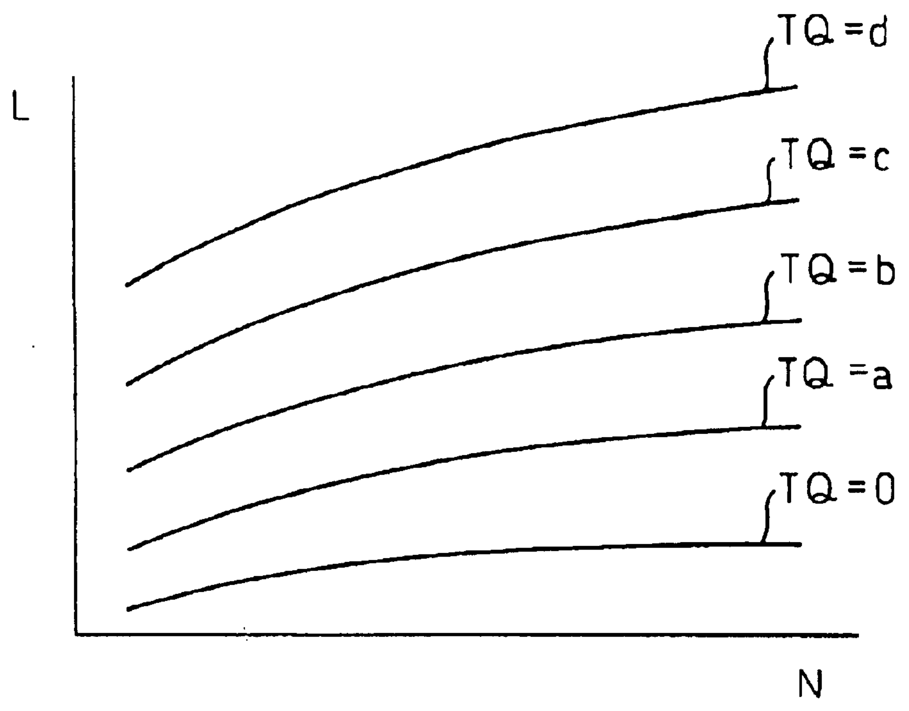
FIGS. 2A and 2B are views of a required torque of an engine.
Figure 2B:
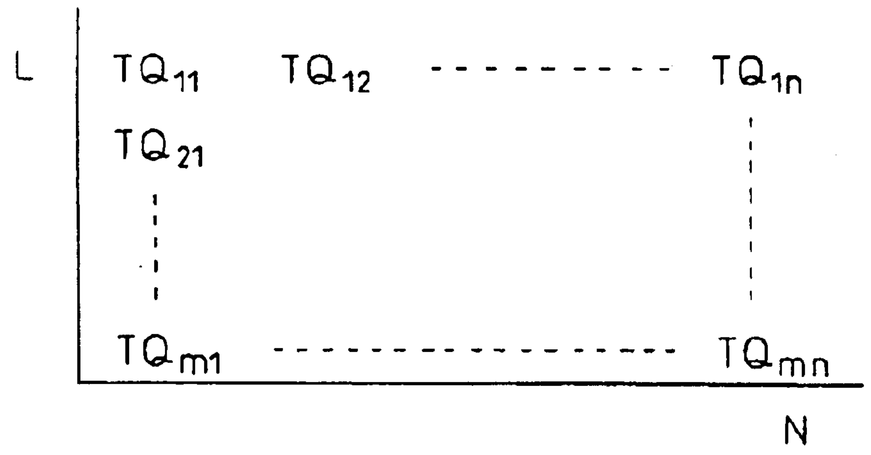

FIG. 2A shows the relationship between the required torque TQ, the amount of depression L of the accelerator pedal 40, and the engine speed N. Note that in FIG. 2A, the curves show the equivalent torque curves. The curve shown by TQ=0 shows the torque is zero, while the remaining curves show gradually increasing required torques in the order of TQ=a, TQ=b, TQ=c, and TQ=d. The required torque TQ shown in FIG. 2A, as shown in FIG. 2B, is stored in the ROM 32 in advance as a function of the amount of depression L of the accelerator pedal 40 and the engine speed N. In this embodiment of the present invention, the required torque TQ in accordance with the amount of depression L of the accelerator pedal 40 and the engine speed N is first calculated from the map shown in FIG. 2B, then the amount of fuel injection etc. are calculated based on the required torque TQ.

Figure 3A:
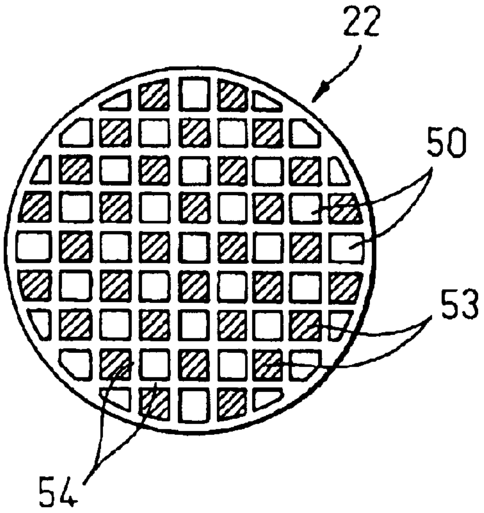
FIGS. 3A and 3B are views of a particulate filter.
Figure 3B:
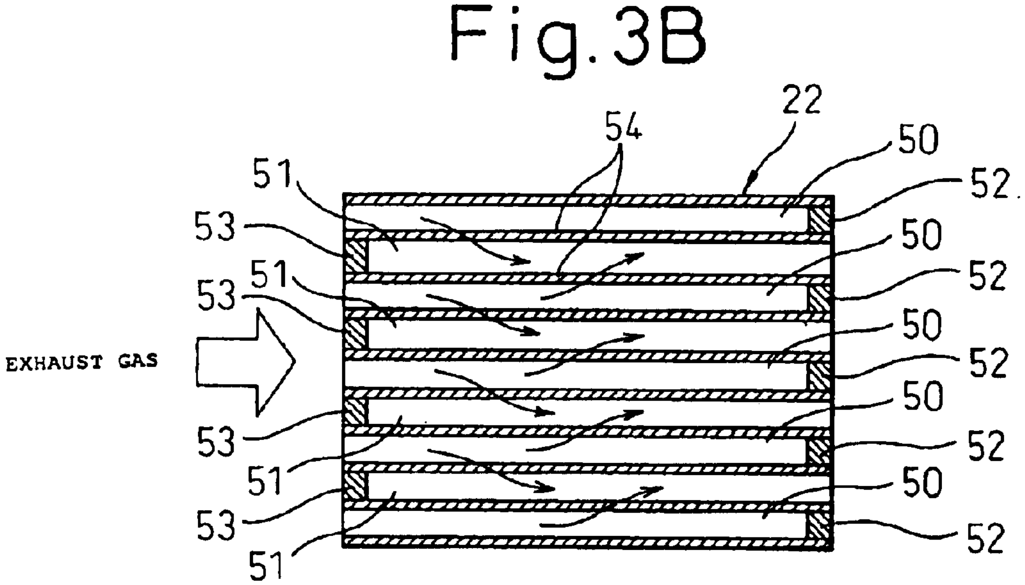

FIGS. 3A and 3B show the structure of the particulate filter 22. Note that FIG. 3A is a front view of the particulate filter 22, while FIG. 3B is a side sectional view of the particulate filter 22. As shown in FIGS. 3A and 3B, the particulate filter 22 forms a honeycomb structure and is provided with a plurality of exhaust circulation passages 50, 51 extending in parallel with each other. These exhaust circulation passages are comprised by exhaust gas inflow passages 50 with downstream ends sealed by plugs 52 and exhaust gas outflow passages 51 with upstream ends sealed by plugs 52. Note that the hatched portions in FIG. 3A show plugs 53. Therefore, the exhaust gas inflow passages 50 and the exhaust gas outflow passages 51 are arranged alternately through thin wall partitions 54. In other words, the exhaust gas inflow passages 50 and the exhaust gas outflow passages 51 are arranged so that each exhaust gas inflow passage 50 is surrounded by four exhaust gas outflow passages 51, and each exhaust gas outflow passage 51 is surrounded by four exhaust gas inflow passages 50.

The particulate filter 22 is formed from a porous material such as for example cordierite. Therefore, the exhaust gas flowing into the exhaust gas inflow passages 50 flows out into the adjoining exhaust gas outflow passages 51 through the surrounding partitions 54 as shown by the arrows in FIG. 3B.

In this embodiment of the present invention, a layer of a carrier comprised of for example alumina is formed on the peripheral surfaces of the exhaust gas inflow passages 50 and the exhaust gas outflow passages 51, that is, the two side surfaces of the partitions 54 and the inside walls of the fine holes in the partitions 54. On the carrier are carried a precious metal catalyst and an active oxygen release agent which absorbs the oxygen and holds the oxygen if excess oxygen is present in the surroundings and releases the held oxygen in the form of active oxygen if the concentration of the oxygen in the surroundings falls.

In this case, in this embodiment according to the present invention, platinum Pt is used as the precious metal catalyst. As the active oxygen release agent, use is made of at least one of an alkali metal such as potassium K, sodium Na, lithium Li, cesium Cs, and rubidium Rb, an alkali earth metal such as barium Ba, calcium Ca, and strontium Sr, a rare earth such as lanthanum La, yttrium Y, and cesium Ce, and a transition metal such as tin Sn and iron Fe.

Note that in this case, as the active oxygen release agent, use is preferably made of an alkali metal or an alkali earth metal with a higher tendency of ionization than calcium Ca, that is, potassium K, lithium Li, cesium Cs, rubidium Rb, barium Ba, and strontium Sr or use is made of cerium.

Next, the action of removal of the particulate in the exhaust gas by the particulate filter 22 will be explained taking as an example the case of carrying platinum Pt and potassium K on a carrier, but the same type of action for removal of particulate is performed even when using another precious metal, alkali metal, alkali earth metal, rare earth, and transition metal.

In a compression ignition type internal combustion engine such as shown in FIG. 1, combustion occurs under an excess of air. Therefore, the exhaust gas contains a large amount of excess air. That is, if the ratio of the air and fuel fed into the intake passage, combustion chamber 5, and exhaust passage is called the air-fuel ratio of the exhaust gas, then in a compression ignition type internal combustion engine such as shown in FIG. 1, the air-fuel ratio of the exhaust gas becomes lean. Further, in the combustion chamber 5, NO is generated, so the exhaust gas contains NO. Further, the fuel contains sulfur S. This sulfur S reacts with the oxygen in the combustion chamber 5 to become $SO_2$. Therefore, the exhaust gas contains $SO_2$. Accordingly, exhaust gas containing excess oxygen, $NO_x$ and $SO_2$ flows into the exhaust gas inflow passages 50 of the particulate filter 22.

Figure 4A:
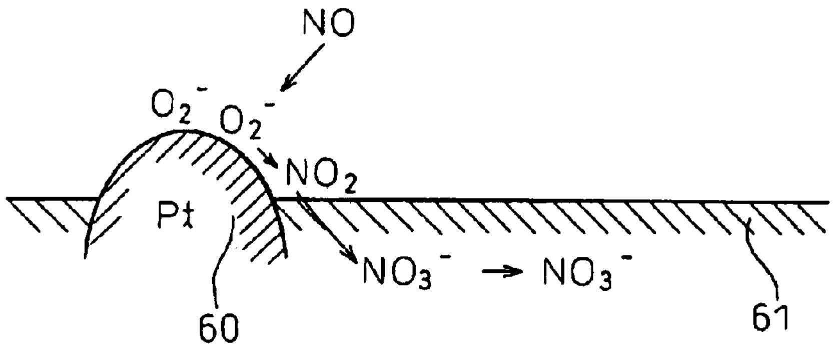
FIGS. 4A and 4B are views for explaining an action of oxidation of particulate.
Figure 4B:
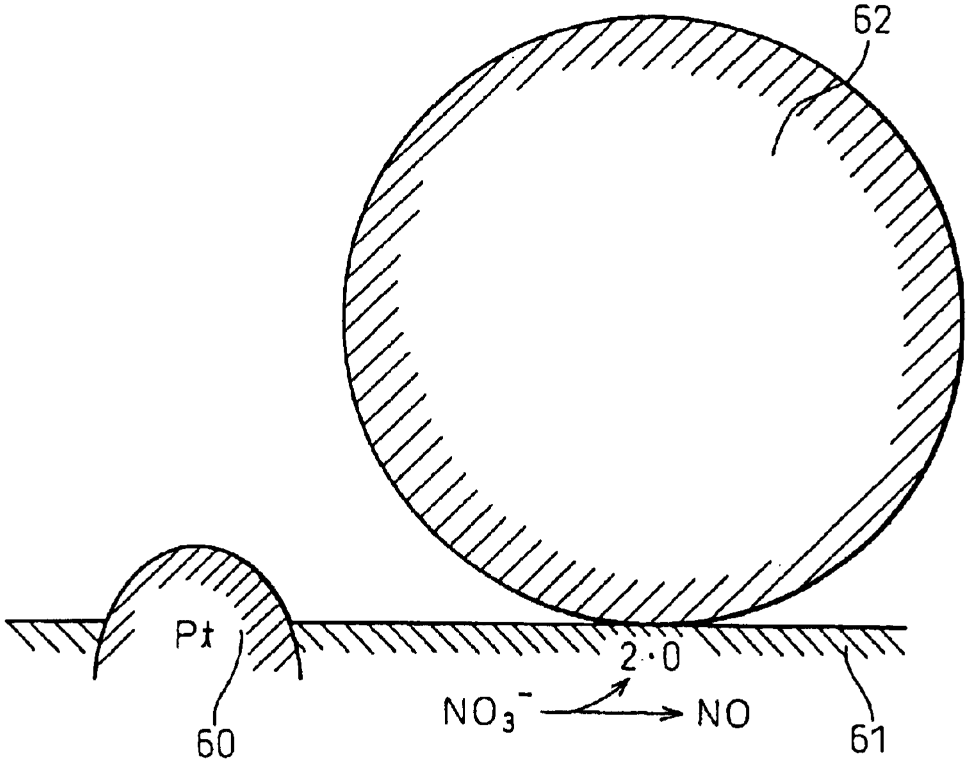

FIGS. 4A and 4B are enlarged views of the surface of the carrier layer formed on the inner circumferential surfaces of the exhaust gas inflow passages 50 and the inside walls of the fine holes in the partitions 54. Note that in FIGS. 4A and 4B, 60 indicates particles of platinum Pt, while 61 indicates the active oxygen release agent containing potassium K.

In this way, since a large amount of excess oxygen is contained in the exhaust gas, if the exhaust gas flows into the exhaust gas inflow passages 50 of the particulate filter 22, as shown in FIG. 4A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO+O_2 \rightarrow 2NO_2$). Next, part of the $NO_2$ which is produced is absorbed in the active oxygen release agent 61 while being oxidized on the platinum Pt and diffuses in the active oxygen release agent 61 in the form of nitrate ions $NO_3^-$ as shown in FIG. 4A. Part of the nitrate ions $NO_3^-$ produces potassium nitrate $KNO_3$.

On the other hand, as explained above, the exhaust gas also contains $SO_2$. This $SO_2$ is absorbed in the active oxygen release agent 61 by a mechanism similar to that of NO. That is, in the above way, the oxygen $O_2$ adheres to the surface of the platinum Pt in the form of $O_2^-$ or $O^{2-}$. The $SO_2$ in the exhaust gas reacts with the $O_2^-$ or $O^{2-}$ on the surface of the platinum Pt to become $SO_3$. Next, part of the $SO_3$ which is produced is absorbed in the active oxygen release agent 61 while being oxidized on the platinum Pt and diffuses in the active oxygen release agent 61 in the form of sulfate ions $SO_4^{2-}$ while bonding with the potassium Pt to produce potassium sulfate $K_2SO_4$. In this way, potassium sulfate $KNO_3$ and potassium sulfate $K_2SO_4$ are produced in the active oxygen release agent 61.

On the other hand, particulate comprised of mainly carbon is produced in the combustion chamber 5. Therefore, the exhaust gas contains this particulate. The particulate contained in the exhaust gas contacts and adheres to the surface of the carrier layer, for example, the surface of the active oxygen release agent 61, as shown in FIG. 4B when the exhaust gas is flowing through the exhaust gas inflow passages 50 of the particulate filter 22 or when heading from the exhaust gas inflow passages 50 to the exhaust gas outflow passages 51.

If the particulate 62 adheres to the surface of the active oxygen release agent 61 in this way, the concentration of oxygen at the contact surface of the particulate 62 and the active oxygen release agent 61 falls. If the concentration of oxygen falls, a difference in concentration occurs with the inside of the high oxygen concentration active oxygen release agent 61 and therefore the oxygen in the active oxygen release agent 61 moves toward the contact surface between the particulate 62 and the active oxygen release agent 61. As a result, the potassium sulfate $KNO_3$ formed in the active oxygen release agent 61 is broken down into potassium K, oxygen O, and NO. The oxygen O heads toward the contact surface between the particulate 62 and the active oxygen release agent 61, while the NO is released from the active oxygen release agent 61 to the outside. The NO released to the outside is oxidized on the downstream side platinum Pt and is again absorbed in the active oxygen release agent 61.

On the other hand, if the temperature of the particulate filter 22 is high at this time, the potassium sulfate $K_2SO_4$ formed in the active oxygen release agent 61 is also broken down into potassium K, oxygen O, and $SO_2$. The oxygen O heads toward the contact surface between the particulate 62 and the active oxygen release agent 61, while the $SO_2$ is released from the active oxygen release agent 61 to the outside. The $SO_2$ released to the outside is oxidized on the downstream side platinum Pt and again absorbed in the active oxygen release agent 61.

On the other hand, the oxygen O heading toward the contact surface between the particulate 62 and the active oxygen release agent 61 is the oxygen broken down from compounds such as potassium sulfate $KNO_3$ or potassium sulfate $K_2SO_4$. The oxygen O broken down from these compounds has a high energy and has an extremely high activity. Therefore, the oxygen heading toward the contact surface between the particulate 62 and the active oxygen release agent 61 becomes active oxygen O. If this active oxygen O contacts the particulate 62, the oxidation action of the particulate 62 is promoted and the particulate 62 is oxidized without emitting a luminous flame for a short period of several minutes to several tens of minutes. While the particulate 62 is being oxidized in this way, other particulate is successively depositing on the particulate filter 22. Therefore, in practice, a certain amount of particulate is always depositing on the particulate filter 22. Part of this depositing particulate is removed by oxidation. In this way, the particulate 62 deposited on the particulate filter 22 is continuously burned without emitting luminous flame.

Note that the $NO_x$ is considered to diffuse in the active oxygen release agent 61 in the form of nitrate ions $NO_3^-$ while repeatedly bonding with and separating from the oxygen atoms. Active oxygen is produced during this time as well. The particulate 62 is also oxidized by this active oxygen. Further, the particulate 62 deposited on the particulate filter 22 is oxidized by the active oxygen O, but the particulate 62 is also oxidized by the oxygen in the exhaust gas.

When the particulate deposited in layers on the particulate filter 22 is burned, the particulate filter 22 becomes red hot and burns along with a flame. This burning along with a flame does not continue unless the temperature is high. Therefore, to continue burning along with such flame, the temperature of the particulate filter 22 must be maintained at a high temperature.

As opposed to this, in the present invention, the particulate 62 is oxidized without emitting a luminous flame as explained above. At this time, the surface of the particulate filter 22 does not become red hot. That is, in other words, in the present invention, the particulate 62 is removed by oxidation by a considerably low temperature. Accordingly, the action of removal of the particulate 62 by oxidation without emitting a luminous flame according to the present invention is completely different from the action of removal of particulate by burning accompanied with a flame.

The platinum Pt and the active oxygen release agent 61 become more active the higher the temperature of the particulate filter 22, so the amount of the active oxygen O able to be released by the active oxygen release agent 61 per unit time increases the higher the temperature of the particulate filter 22. Further, only naturally, the particulate is more easily removed by oxidation the higher the temperature of the particulate itself. Therefore, the amount of the particulate removable by oxidation on the particulate filter 22 per unit time without emitting a luminous flame increases the higher the temperature of the particulate filter 22.

Figure 6:
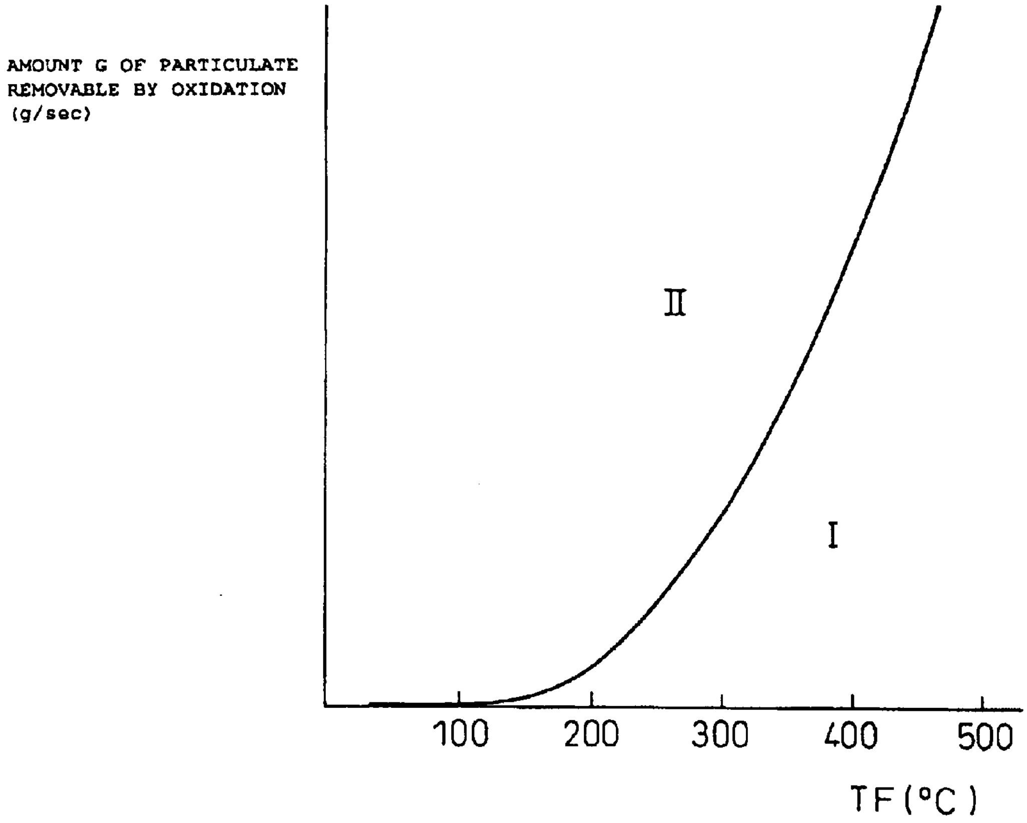
FIG. 6 is a view of the relationship between the amount of particulate removable by oxidation and the temperature of the particulate filter.

The solid line in FIG. 6 shows the amount G of the particulate removable by oxidation per unit time without emitting a luminous flame. The abscissa of FIG. 6 shows the temperature TF of the particulate filter 22. Note that FIG. 6 shows the amount G of particulate removable by oxidation in the case where the unit time is 1 second, that is, per second, but 1 minute, 10 minutes, or any other time may also be employed as the unit time. For example, when using 10 minutes as the unit time, the amount G of particulate removable by oxidation per unit time expresses the amount G of particulate removable by oxidation per 10 minutes. In this case as well, the amount G of particulate removable by oxidation on the particulate filter 22 per unit time without emitting a luminous flame, as shown in FIG. 6, increases the higher the temperature of the particulate filter 22.

Now, if the amount of the particulate discharged from the combustion chamber 5 per unit time is called the amount M of discharged particulate, when the amount M of discharged particulate is smaller than the amount G of particulate removable by oxidation for the same unit time or when the amount M of discharged particulate per 10 minutes is smaller than the amount G of particulate removable by oxidation per 10 minutes, that is, in the region I of FIG. 6, all of the particulate discharged from the combustion chamber 5 is removed by oxidation successively in a short time on the particulate filter 22 without emitting a luminous flame.

Figure 5A:
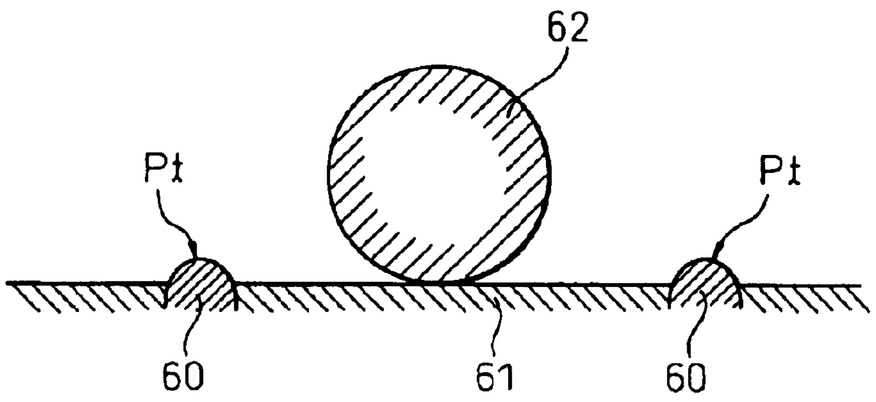
FIGS. 5A to 5C are views for explaining an action of deposition of particulate.
Figure 5B:
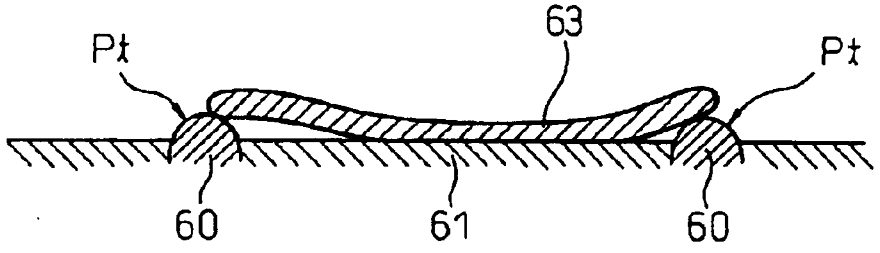
Figure 5C:
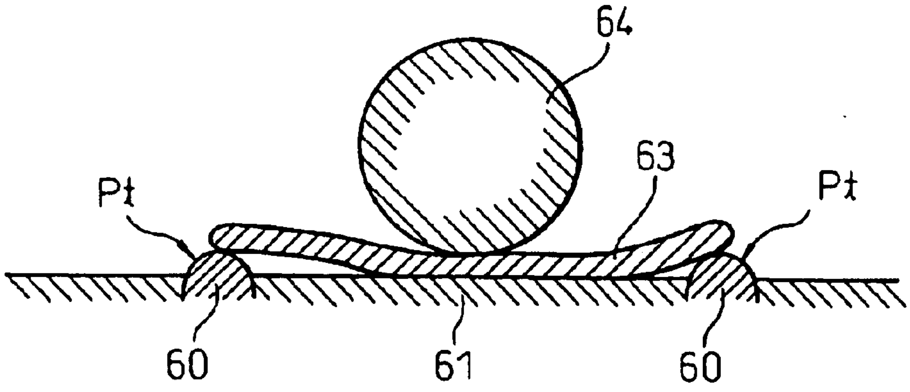

As opposed to this, when the amount M of discharged particulate is larger than the amount G of particulate removable by oxidation, that is, in the region II of FIG. 6, the amount of active oxygen is not sufficient for successive oxidation of all of the particulate. FIGS. 5A to 5C show the state of oxidation of particulate in this case.

That is, when the amount of active oxygen is not sufficient for successive oxidation of all of the particulate, if particulate 62 adheres on the active oxygen release agent 61 as shown in FIG. 5A, only part of the particulate 62 is oxidized. The portion of the particulate not sufficiently oxidized remains on the carrier layer. Next, if the state of insufficient amount of active oxygen continues, the portions of the particulate not oxidized successively are left on the carrier layer. As a result, as shown in FIG. 5B, the surface of the carrier layer is covered by the residual particulate portion 63.

This residual particulate portion 63 covering the surface of the carrier layer gradually changes to hard-to-oxidize graphite and therefore the residual particulate portion 63 easily remains as it is. Further, if the surface of the carrier layer is covered by the residual particulate portion 63, the action of oxidation of the NO and $SO_2$ by the platinum Pt and the action of release of the active oxygen from the active oxygen release agent 61 are suppressed. As a result, as shown in FIG. 5C, other particulate 64 successively deposits on the residual particulate portion 63. That is, the particulate deposits in layers. If the particulate deposits in layers in this way, the particulate is separated in distance from the platinum Pt or the active oxygen release agent 61, so even if easily oxidizable particulate, it will not be oxidized by active oxygen O. Therefore, other particulate successively deposits on the particulate 64. That is, if the state of the amount M of discharged particulate being larger than the amount G of particulate removable by oxidation continues, particulate deposits in layers on the particulate filter 22 and therefore unless the temperature of the exhaust gas is made higher or the temperature of the particulate filter 22 is made higher, it is no longer possible to cause the deposited particulate to ignite and burn.

In this way, in the region I of FIG. 6, the particulate is burned in a short time on the particulate filter 22 without emitting a luminous flame. In the region II of FIG. 6, the particulate deposits in layers on the particulate filter 22. Therefore, to prevent the particulate from depositing in layers on the particulate filter 22, the amount M of discharged particulate has to be kept smaller than the amount G of the particulate removable by oxidation at all times.

As will be understood from FIG. 6, with the particulate filter 22 used in this embodiment of the present invention, the particulate can be oxidized even if the temperature TF of the particulate filter 22 is considerably low. Therefore, in a compression ignition type internal combustion engine shown in FIG. 1, it is possible to maintain the amount M of the discharged particulate and the temperature TF of the particulate filter 22 so that the amount M of discharged particulate normally becomes smaller than the amount G of the particulate removable by oxidation. Therefore, in this embodiment of the present invention, the amount M of discharged particulate and the temperature TF of the particulate filter 22 are maintained so that the amount M of discharged particulate usually becomes smaller than the amount G of the particulate removable by oxidation.

If the amount M of discharged particulate is maintained to be usually smaller than the amount G of particulate removable by oxidation in this way, the particulate no longer deposits in layers on the particulate filter 22. As a result, the pressure loss of the flow of exhaust gas in the particulate filter 22 is maintained at a substantially constant minimum pressure loss—to the extent of being able to be said to not change much at all. Therefore, it is possible to maintain the drop in output of the engine at a minimum.

Further, the action of removal of particulate by oxidation of the particulate takes place even at a considerably low temperature. Therefore, the temperature of the particulate filter 22 does not rise that much at all and consequently there is almost no risk of deterioration of the particulate filter 22. Further, since the particulate does not deposit in layers on the particulate filter 22, there is no danger of coagulation of ash and therefore there is less danger of the particulate filter 22 clogging.

This clogging however occurs mainly due to the calcium sulfate $CaSO_4$. That is, fuel or lubrication oil contains calcium Ca. Therefore, the exhaust gas contains calcium Ca. This calcium Ca produces calcium sulfate $CaSO_4$ in the presence of $SO_3$. This calcium sulfate $CaSO_4$ is a solid and will not break down by heat even at a high temperature. Therefore, if calcium sulfate $CaSO_4$ is produced and the fine holes of the particulate filter 22 are clogged by this calcium sulfate $CaSo_4$, clogging occurs.

In this case, however, if an alkali metal or an alkali earth metal having a higher tendency toward ionization than calcium Ca, for example potassium K, is used as the active oxygen release agent 61, the $SO_3$ diffused in the active oxygen release agent 61 bonds with the potassium K to form potassium sulfate $K_2SO_4$. The calcium Ca passes through the partitions 54 of the particulate filter 22 and flows out into the exhaust gas outflow passage 51 without bonding with the $SO_3$. Therefore, there is no longer any clogging of fine holes of the particulate filter 22. Accordingly, as described above, it is preferable to use an alkali metal or an alkali earth metal having a higher tendency toward ionization than calcium Ca, that is, potassium K, lithium Li, cesium Cs, rubidium Rb, barium Ba, and strontium Sr, as the active oxygen release agent 61.

Now, in this embodiment of the present invention, the intention is basically to maintain the amount M of the discharged particulate smaller than the amount G of the particulate removable by oxidation in all operating states. In practice, however, even if trying to keep the amount M of discharged particulate lower than the amount G of the particulate removable by oxidation in all operating states in this way, the amount M of discharged particulate becomes larger than the amount G of the particulate removable by oxidation in some cases due to rapid change in the operating state of the engine or some other reason. If the amount M of discharged particulate becomes larger than the amount G of the particulate removable by oxidation in this way, as explained above, the portion of the particulate which could not be oxidized on the particulate filter 22 starts to be left.

At this time, if the state where the amount M of discharged particulate is larger than the amount G of the particulate removable by oxidation continues, as explained above, the particulate ends up depositing in layers on the particulate filter 22. When this portion of the particulate which could not be oxidized in this way starts to be left, that is, when the particulate only deposits less than a certain limit, if the amount M of discharged particulate becomes smaller than the amount G of the particulate removable by oxidation, the portion of the residual particulate is removed by oxidation by the active oxygen O without emitting a luminous flame. Therefore, even if the amount M of discharged particulate becomes larger than the amount G of the particulate removable by oxidation, if the amount M of discharged particulate is made smaller than the amount G of the particulate removable by oxidation before the particulate deposits in layers, the particulate will no longer deposit in layers.

Therefore, in this embodiment of the present invention, when the amount M of discharged particulate becomes larger than the amount G of the particulate removable by oxidation, the amount M of discharged particulate is made smaller than the amount G of the particulate removable by oxidation.

Note that there are sometimes cases where the particulate deposits in layers on the particulate filter 22 due to some reason or another even if the amount M of discharged particulate is made smaller than the amount G of the particulate removable by oxidation when the amount M of discharged particulate becomes larger than the amount G of the particulate removable by oxidation. Even in this case, if the air-fuel ratio of part or all of the exhaust gas is made temporarily rich, the particulate deposited on the particulate filter 22 is oxidized without emitting a luminous flame. That is, if the air-fuel ratio of the exhaust gas is made rich, that is, if the concentration of oxygen in the exhaust gas is lowered, the active oxygen O is released all at once to the outside from the active oxygen release agent 61. The particulate deposited by the active oxygen O released all at once is removed by oxidation in a short time without emitting a luminous flame.

On the other hand, if the air-fuel ratio is maintained lean, the surface of the platinum Pt is covered by oxygen and so-called oxygen toxification of the platinum Pt occurs. If such oxygen toxification occurs, the action of oxidation of the $NO_x$ falls, so the efficiency of $NO_x$ absorption falls and therefore the amount of release of active oxygen from the active oxygen release agent 61 falls. If the air-fuel ratio is made rich, however, the oxygen on the surface of the platinum Pt is consumed, so the oxygen toxification is eliminated. Therefore, if the air-fuel ratio is changed from rich to lean, the action of oxidation of the $NO_x$ becomes stronger, so the efficiency of $NO_x$ absorption becomes higher and therefore the amount of release of active oxygen from the active oxygen release agent 61 increases.

Therefore, if the air-fuel ratio is sometimes switched from lean to rich when the air-fuel ratio is maintained lean, the oxygen toxification of the platinum Pt is eliminated each time. Therefore the amount of release of active oxygen increases when the air-fuel ratio is lean and therefore the action of oxidation of the particulate on the particulate filter 22 can be promoted.

Further, cerium Ce has the function of taking in oxygen when the air-fuel ratio is lean ($Ce_2O_3\Delta 2CeO_2$) and releasing active oxygen when the air-fuel ratio becomes rich ($2CeO_2 \rightarrow CeO_3$). Therefore, if cerium Ce is used as the active oxygen release agent, if particulate deposits on the particulate filter 22 when the air-fuel ratio is lean, the particulate will be oxidized by the active oxygen released from the active oxygen release agent, while when the air-fuel ratio becomes rich, a large amount of active oxygen will be released from the active oxygen release agent 61 and therefore the particulate will be oxidized. Accordingly, even when using cerium Ce as the active oxygen release agent 61, if switching from lean to rich occasionally, it is possible to promote the oxidation reaction of the particulate on the particulate filter 22.

Now, in FIG. 6, the amount G of the particulate removable by oxidation is shown as a function of only the temperature TF of the particulate filter 22, but the amount G of the particulate removable by oxidation is actually a function of the concentration of oxygen in the exhaust gas, the concentration of $NO_x$ in the exhaust gas, the concentration of unburned hydrocarbons in the exhaust gas, the degree of ease of oxidation of the particulate, the spatial velocity of the flow of exhaust gas in the particulate filter 22, the pressure of the exhaust gas, etc. Therefore, the amount G of the particulate removable by oxidation is preferably calculated taking into consideration the effects of all of the above factors including the temperature TF of the particulate filter 22.

Figure 7A:
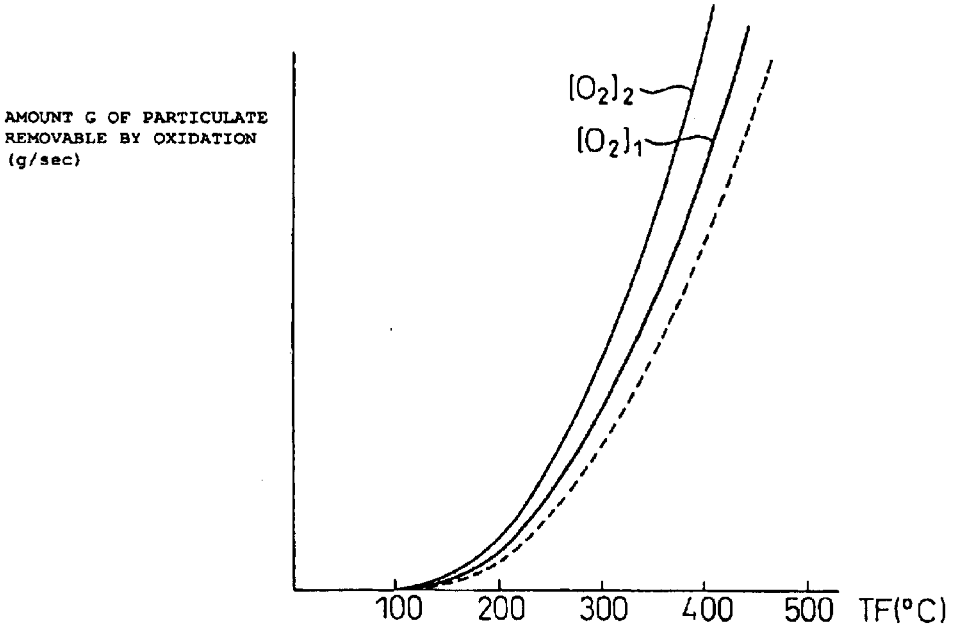
FIGS. 7A and 7B are views of an amount of particulate removable by oxidation.
Figure 7B:
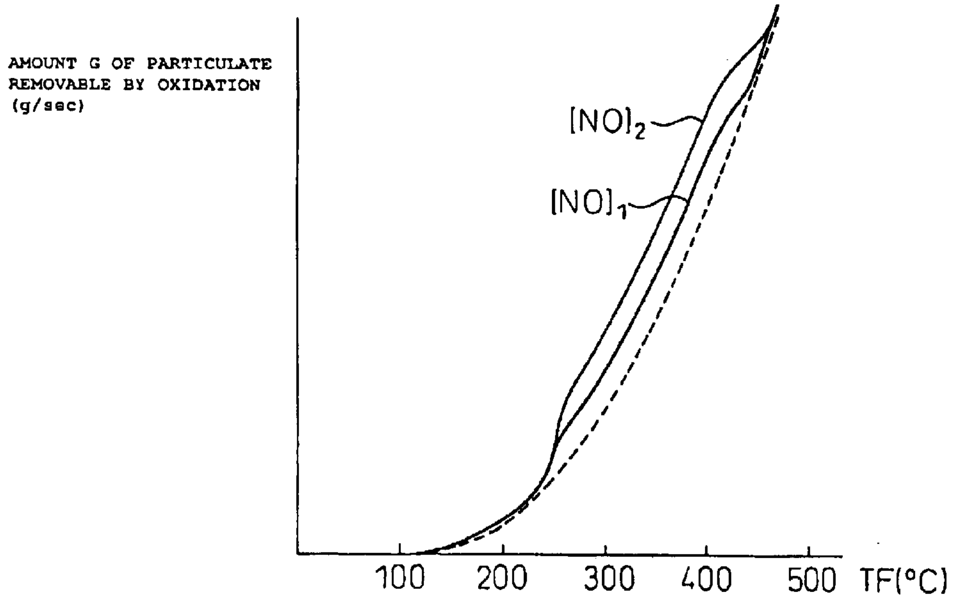
Figure 8A:
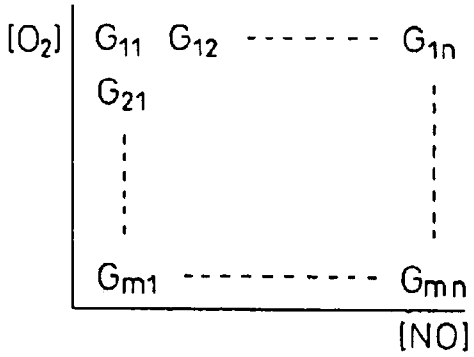
FIGS. 8A to 8F are views of maps of the amount G of particulate removable by oxidation.
Figure 8B:
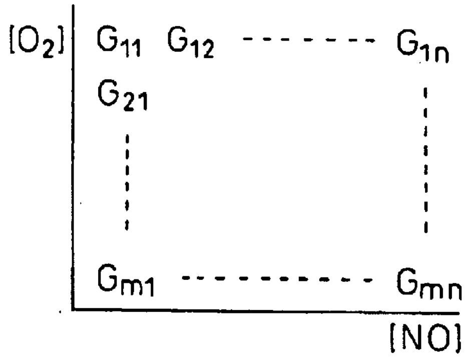
Figure 8C:
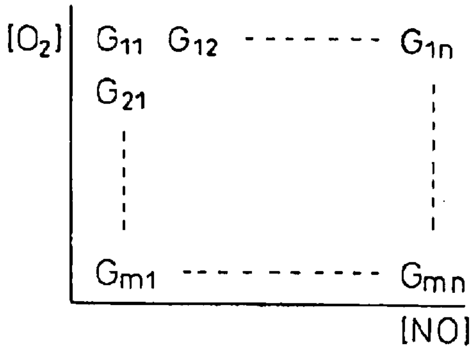
Figure 8D:
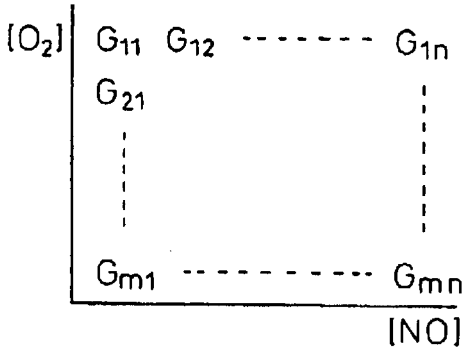
Figure 8E:
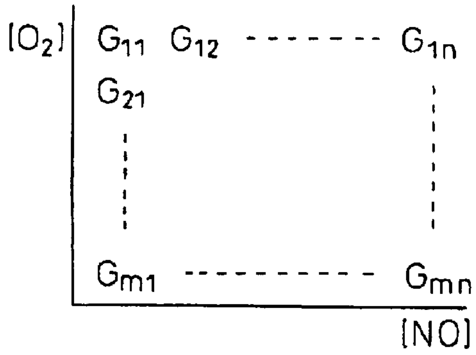
Figure 8F:
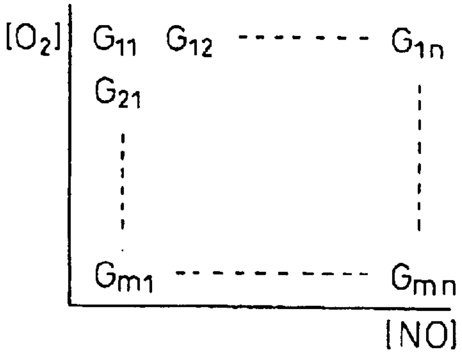

The factor having the greatest effect on the amount G of the particulate removable by oxidation among these however is the temperature TF of the particulate filter 22. Factors having relatively large effects are the concentration of oxygen in the exhaust gas and the concentration of NOR. FIG. 7A shows the change of the amount G of the particulate removable by oxidation when the temperature TF of the particulate filter 22 and the concentration of oxygen in the exhaust gas change. FIG. 7B shows the change of the amount G of the particulate removable by oxidation when the temperature TF of the particulate filter 22 and the concentration of $NO_x$ in the exhaust gas change. Note that in FIGS. 7A and 7B, the broken lines show the cases when the concentration of oxygen and the concentration of $NO_x$ in the exhaust gas are the reference values. In FIG. 7A, $[O_2]_1$ shows the case when the concentration of oxygen in the exhaust gas is higher than the reference value, while $[O_2]_2$ shows the case where the concentration of oxygen is further higher than $[O_2]_1$. In FIG. 7B, $[NO]_1$ shows the case when the concentration of $NO_x$ in the exhaust gas is higher than the reference value, while $[NO]_2$ shows the case where the concentration of $NO_x$ is further higher than $[NO]_1$.

If the concentration of oxygen in the exhaust gas becomes high, the amount G of the particulate removable by oxidation increases even by just that. Since the amount of oxygen absorbed into the active oxygen release agent 61 further increases, however, the active oxygen released from the active oxygen release agent 61 also increases. Therefore, as shown in FIG. 7A, the higher the concentration of oxygen in the exhaust gas, the more the amount G of the particulate removable by oxidation increases.

On the other hand, the NO in the exhaust gas, as explained earlier, is oxidized on the surface of the platinum Pt and becomes $NO_2$. Part of the thus produced $NO_2$ is absorbed in the active oxygen release agent 61, while the remaining $NO_2$ disassociates to the outside from the surface of the platinum Pt. At this time, if the platinum Pt contacts the $NO_2$, an oxidation reaction will be promoted. Therefore, as shown in FIG. 7B, the higher the concentration of $NO_x$ in the exhaust gas, the more the amount G of the particulate removable by oxidation increases. However, the action of promoting the oxidation of the particulate by the $NO_2$ only occurs while the temperature of the exhaust gas is from about 250° C. to about 450° C., so, as shown in FIG. 7B, if the concentration of $NO_x$ in the exhaust gas becomes higher, the amount G of the particulate removable by oxidation increases while the temperature TF of the particulate filter 22 is from about 250° C. to 450° C.

As explained above, it is preferable to calculate the amount G of the particulate removable by oxidation taking into consideration all of the factors having an effect on the amount G of the particulate removable by oxidation. In this embodiment of the present invention, however, the amount G of the particulate removable by oxidation is calculated based on only the temperature TF of the particulate filter 22 having the largest effect on the amount G of the particulate removable by oxidation among the factors and the concentration of oxygen and the concentration of $NO_x$ in the exhaust gas having relatively large effects.

That is, in this embodiment of the present invention, as shown in FIGS. 8A to 8F, the amounts G of particulates removable by oxidation at various temperatures TF (200° C., 250° C., 300° C., 350° C., 400° C., and 450° C.) are stored in advance in the ROM 32 in the form of map as a function of the concentration of oxygen $[O_2]$ in the exhaust gas and the concentration of $NO_x$ [NO] in the exhaust gas. The amount G of the particulate removable by oxidation in accordance with the temperature TF of the particulate filter 22, the concentration of oxygen $[O_2]$, and the concentration of $NO_x$ [NO] is calculated by proportional distribution from the maps shown from FIGS. 8A to 8F.

Figure 9A:
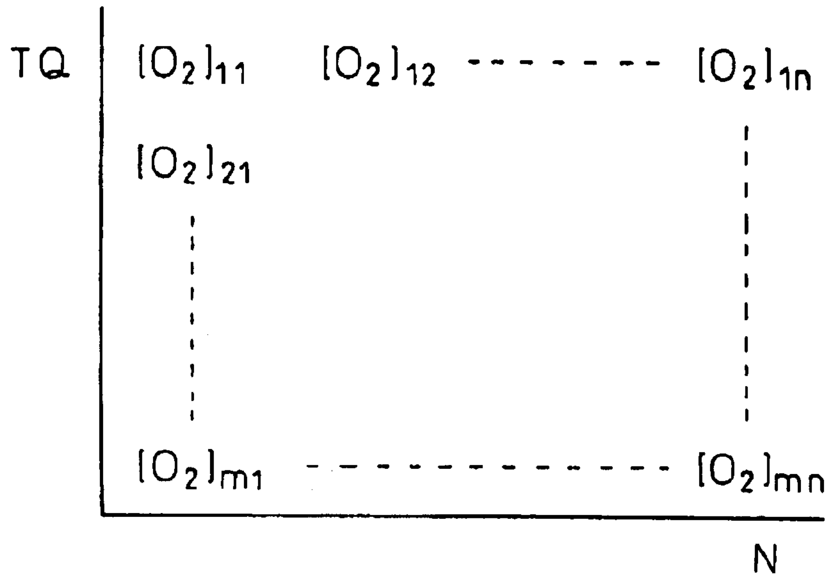
FIGS. 9A and 9B are views of maps of the concentration of oxygen and the concentration of $NO_x$ in the exhaust gas.
Figure 9B:
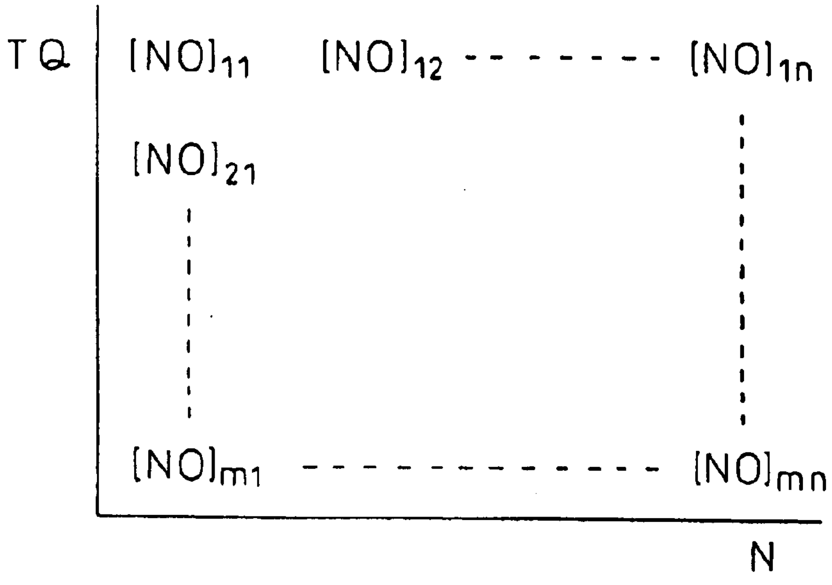

Note that the concentration of oxygen $[O_2]$ and the concentration of $NO_x$ [NO] in the exhaust gas can be detected using an oxygen concentration sensor and a $NO_x$ concentration sensor. In this embodiment of the present invention, however, the concentration of oxygen $[O_2]$ in the exhaust gas is stored in advance in the ROM 32 in the form of a map as shown in FIG. 9A as a function of the required torque TQ and engine speed N. The concentration of $NO_x$ [NO] in the exhaust gas is stored in advance in the ROM 32 in the form of a map as shown in FIG. 9B as a function of the required torque TQ and the engine speed N. The concentration of oxygen $[O_2]$ and concentration of $NO_x$ [NO] in the exhaust gas are calculated from these maps.

Figure 10A:
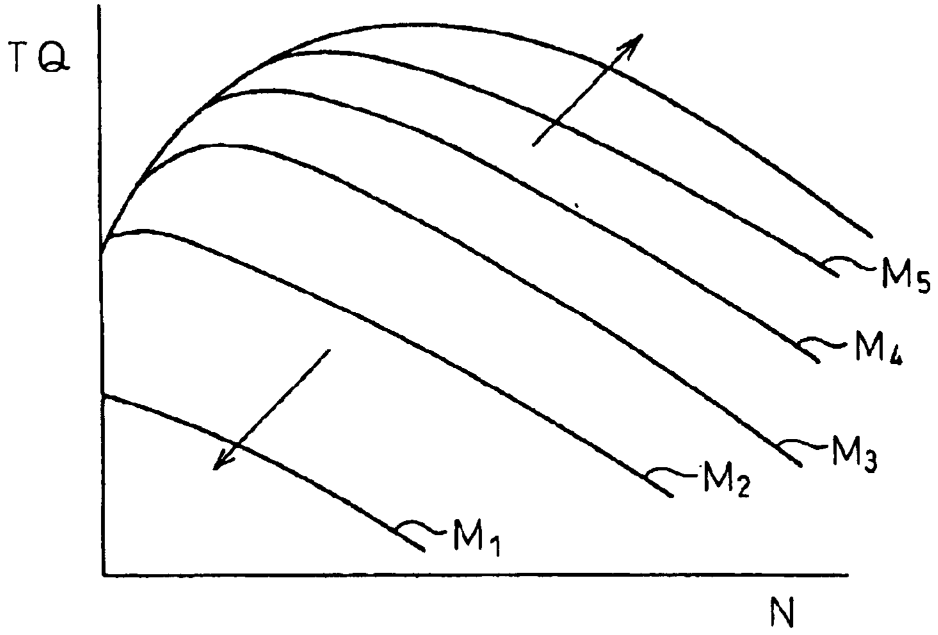
FIGS. 10A and 10B are views of the amount of discharged particulate.
Figure 10B:
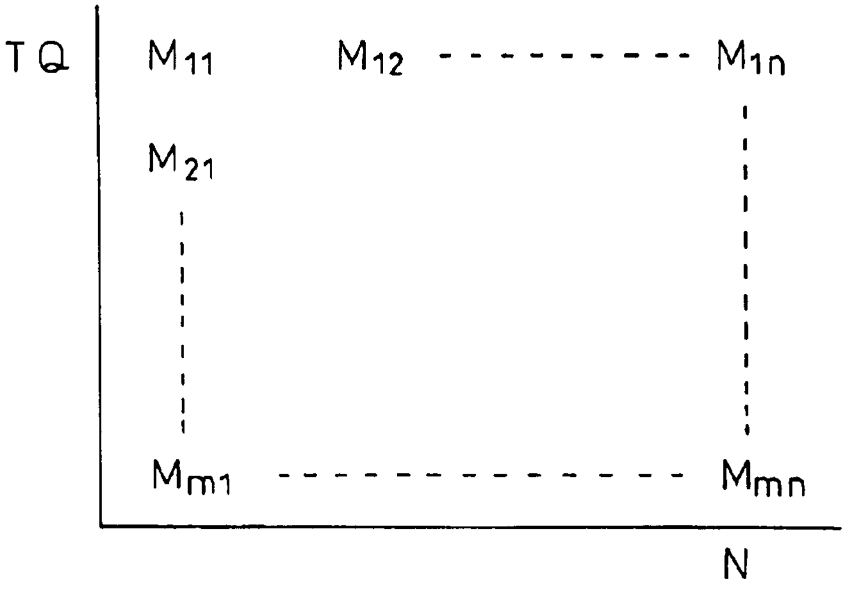

On the other hand, the amount G of the particulate removable by oxidation changes according to the type of the engine, but once the type of the engine is determined, becomes a function of the required torque TQ and the engine speed N. FIG. 10A shows the amount M of discharged particulate of the internal combustion engine shown in FIG. 1. The curves $M_1$, $M_2$, $M_3$, $M_4$, and $M_5$ show the amounts of equivalent discharged particulate ($M_1<M_2<M_3<M_4<M_5$). In the example shown in FIG. 10A, the higher the required torque TQ, the more the amount M of discharged particulate increases. Note that the amount M of discharged particulate shown in FIG. 10A is stored in advance in the ROM 32 in the form of a map shown in FIG. 10B as a function of the required torque TQ and the engine speed N.

As explained above, in the embodiment according to the present invention, when the amount M of the discharged particulate exceeds the amount G of particulate removable by oxidation, at least one of the amount M of discharged particulate or the amount G of particulate removable by oxidation is controlled so that the amount M of the discharged particulate becomes smaller than the amount G of particulate removable by oxidation.

Note that even if the amount M of discharged particulate becomes somewhat greater than the amount G of particulate removable by oxidation, the amount of particulate deposited on the particulate filter 22 will not become that great. Therefore, it is possible to control at least one of the amount M of discharged particulate and the amount G of particulate removable by oxidation so that the amount M of discharged particulate becomes smaller than the amount G of particulate removable by oxidation when the amount M of discharged particulate becomes larger than an allowable amount (G+α) of the amount G of particulate removable by oxidation plus a certain small value a.

Next, an explanation will be given of the method of control of the operation while referring to FIG. 11.

Figure 11:
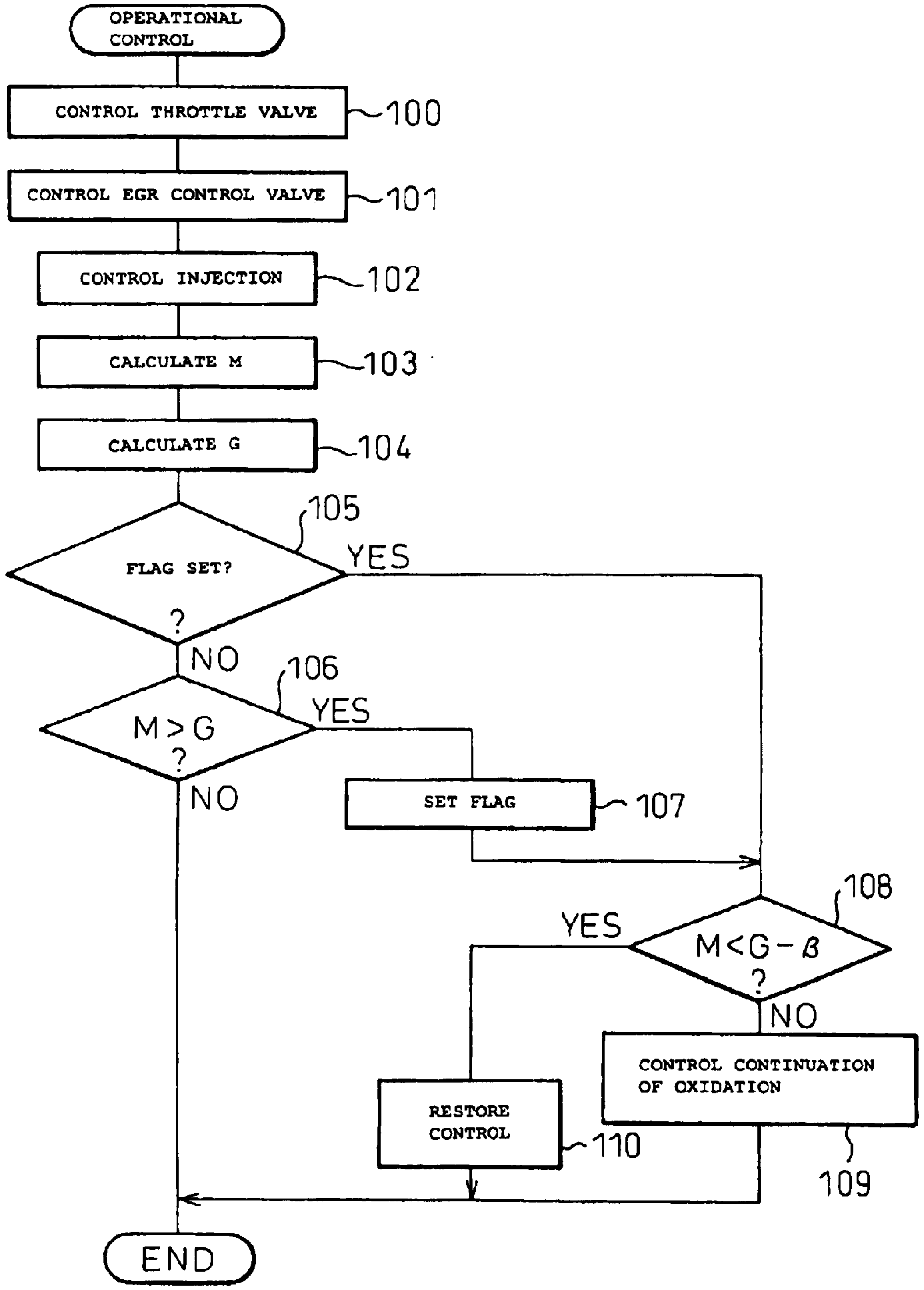
FIG. 11 is a flow chart of control of the engine operation.

Referring to FIG. 11, first, at step 100, the opening degree of the throttle valve 17 is controlled. Next, at step 101, the opening degree of the EGR control valve 25 is controlled. Next, at step 102, the injection from the fuel injector 6 is controlled. Next, at step 103, the amount M of discharged particulate is calculated from the map shown in FIG. 10B. Next, at step 104, the amount G of particulate removable by oxidation in accordance with the temperature TF of the particulate filter 22, the concentration of oxygen $[O_2]$ in the exhaust gas, and the concentration of $NO_x$ [NO] in the exhaust gas are calculated from the maps shown in FIGS. 8A to 8F.

Next, at step 105, it is determined if a flag indicating that the amount M of discharged particulate has become larger than an amount G of particulate removable by oxidation.

When the flag has not been set, the routine proceeds to step 106, where it is determined if the amount M of discharged particulate has become larger than the amount G of particulate removable by oxidation. When M≦G, that is, when the amount M of discharged particulate is the same as the amount M of particulate removable by oxidation or is smaller than the amount G of particulate removable by oxidation, the processing cycle is ended.

AS opposed to this, when it is determined that M>G at step 106, that is, when the amount M of discharged particulate has become larger than the amount G of particulate removable by oxidation, the routine proceeds to step 107, where the flag is set, then the routine proceeds to step 108. When the flag is set, in the next processing cycle, the routine jumps from step 105 to step 108.

At step 108, the amount M of discharged particulate and a control release value (G−β), obtained by subtracting a certain value β from the amount G of particulate removable by oxidation, are compared. When M≧G−β, that is, when the amount M of discharged particulate is larger than the control release value (G−β), the routine proceeds to step 109, where control is performed to continue the action of continuous oxidation of particulate at the particulate filter 22. That is, at least one of the amount M of discharged particulate and the amount G of particulate removable by oxidation is controlled so that the amount M of discharged particulate becomes smaller than the amount G of particulate removable by oxidation.

Next, when it is determined at step 108 that M<G−β, that is, when the amount M of discharged particulate becomes smaller than the control release value (G−β), the routine proceeds to step 110, where control is performed to gradually restore the operating state to the original operating state and the flag is reset.

There are various methods as to the control for continuation of oxidation performed at step 109 in FIG. 11 and the control for restore performed at step 110 in FIG. 11. Next, these various methods of control for continuation of oxidation and control for restore will be successively explained.

One method of making the amount M of discharged particulate smaller than the amount G of particulate removable by oxidation when M>G is to raise the temperature TF of the particulate filter 22. Therefore, first, an explanation will be made of the method of raising the temperature TF of the particulate filter 22.

One method effective for raising the temperature TF of the particulate filter 22 is to retard the fuel injection timing to after the top dead center of the compression stroke. That is, normally the main fuel $Q_m$ is injected near top dead center of the compression stroke as shown by (I) in FIG. 12. In this case, if the injection timing of the main fuel $Q_m$ is retarded as shown in (II) of FIG. 12, the combustion time becomes longer and therefore the exhaust gas temperature rises. If the exhaust gas temperature rises, the temperature TF of the particulate filter 22 becomes higher along with that and as a result the state where M<G is achieved.

Figure 12:
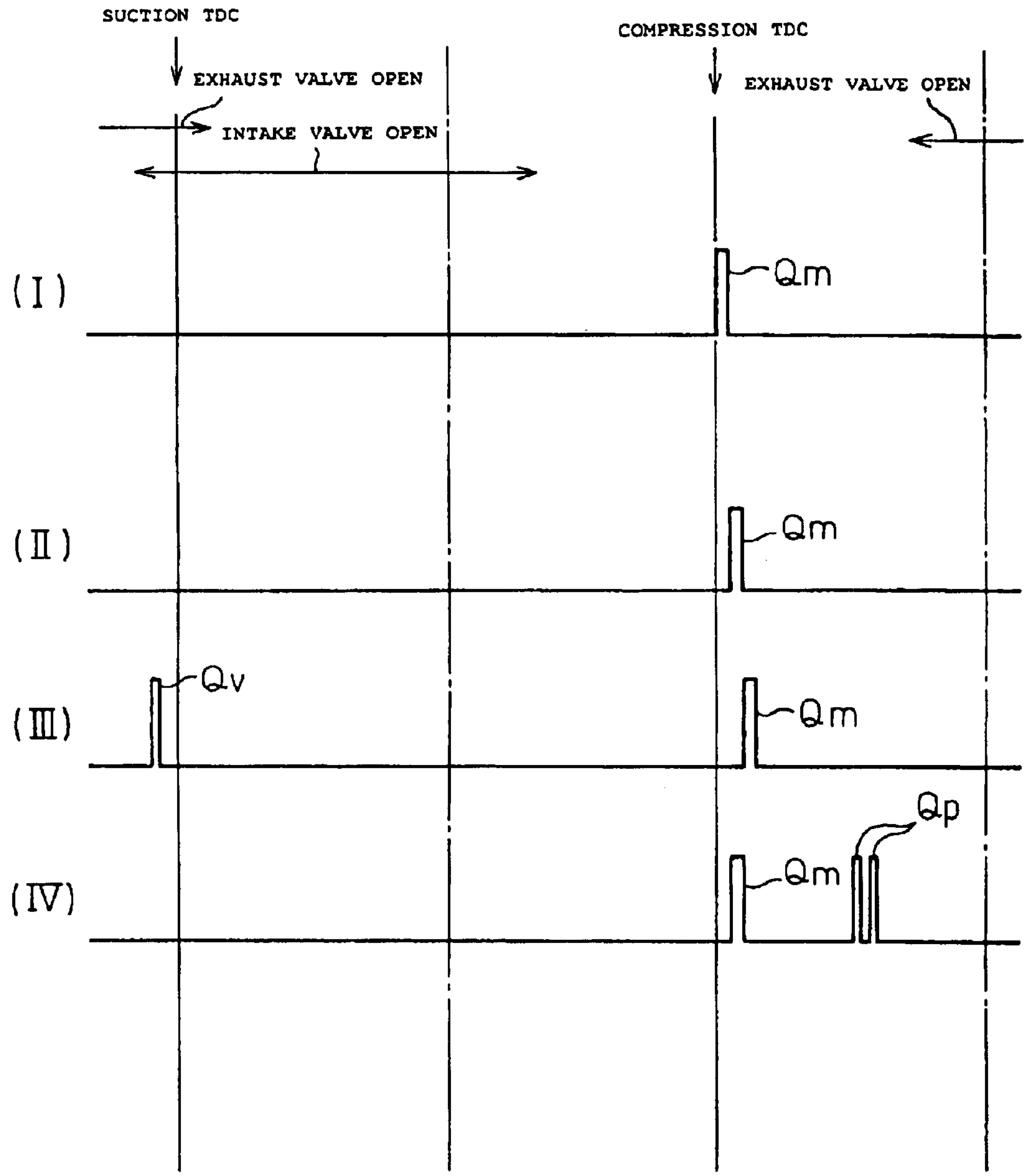
FIG. 12 is a view for explaining injection control.

Further, to raise the temperature TF of the particulate filter 22, it is also possible to inject auxiliary fuel $Q_v$ in addition to the main fuel $Q_m$ near top dead center of the suction stroke as shown in (III) of FIG. 12. If additionally injecting the auxiliary fuel $Q_v$ in this way, the fuel which is burned is increased by exactly the amount of the auxiliary fuel $Q_v$ and therefore the temperature TF of the particulate filter 22 rises.

On the other hand, if injecting auxiliary fuel $Q_v$ near top dead center of the suction stroke in this way, aldehydes, ketones, peroxides, carbon monoxide, and other intermediate products are produced from this auxiliary fuel $Q_v$ due to the heat of combustion during the compression stroke. The reaction of the main fuel $Q_m$ is accelerated by these intermediate products. Therefore, in this case, even if the injection timing of the main fuel $Q_m$ is retarded a great extent as shown in (III) of FIG. 12, good combustion will be obtained without causing misfires. That is, since it is possible to greatly retard the injection timing of the main fuel $Q_m$ in this way, the exhaust gas temperature becomes considerably high and therefore the temperature TF of the particulate filter 22 can be made to quickly rise.

Further, to raise the temperature TF of the particulate filter 22, it is also possible to inject auxiliary fuel $Q_p$ into the expansion stroke or discharge stroke in addition to the main fuel $Q_m$ as shown by (IV) in FIG. 12. That is, in this case, the large majority of the auxiliary fuel $Q_p$ is discharged into the exhaust passage in the form of unburned HC without being burned. This unburned HC is oxidized by the excess oxygen in the particulate filter 22. The temperature TF of the particulate filter 22 is made to rise by the heat of the oxidation reaction occurring at that time.

In the example explained up to here, as shown in (I) of FIG. 12 for example, when the main fuel $Q_m$ is being injected, if it is determined at step 106 of FIG. 11 that M>G, the injection is controlled as shown in (II) or (III) or (IV) of FIG. 12 at step 109 of FIG. 11. Next, when it is determined at step 108 of FIG. 11 that M<G−β, control is performed to restore the injection method to the injection method shown in (I) of FIG. 12 at step 110.

Next, the method of using low temperature combustion to make M<G will be explained.

Figure 13:
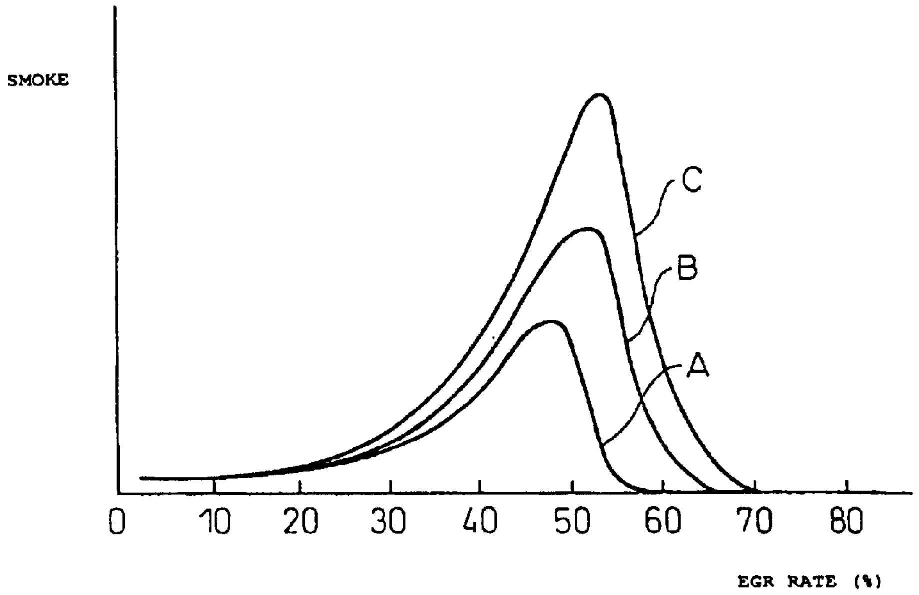
FIG. 13 is a view of the amount of generation of smoke.

That is, it is known that if the EGR rate is increased, the amount of smoke generated gradually increases to reach a peak and that when the EGR rate is further raised, the amount of generation of smoke rapidly falls. This will be explained with reference to FIG. 13 showing the relationship between the EGR rate and smoke when changing the degree of cooling of the EGR gas. Note that in FIG. 13, the curve A shows the case where the EGR gas is force-cooled to maintain the EGR gas temperature at about 90° C., the curve b shows the case of using a small-sized cooling device to cool the EGR gas, and the curve C shows the case where the EGR gas is not force-cooled.

When force cooling the EGR gas such as shown by the curve A of FIG. 13, the amount of generation of smoke peaks when the EGR rate is a bit lower than 50 percent. In this case, if the EGR rate is made more than 55 percent or so, almost no smoke will be generated any longer. On the other hand, as shown by the curve B of FIG. 13, when slightly cooling the EGR gas, the amount of generation of smoke will peak when the EGR rate is slightly higher than 50 percent. In this case, if the EGR rate is made more than least 65 percent or so, almost no smoke will be generated any longer. Further, as shown by the curve C of FIG. 13, when not force-cooling the EGR gas, the amount of generation of smoke peaks at near 55 percent. In this case, if the EGR rate is made more than 70 percent or so, almost no smoke will be generated any longer.

The reason why no smoke is generated any longer if making the EGR gas rate more than 55 percent in this way is that the temperature of the fuel and the surrounding gas at the time of combustion will not become that high due to the heat absorbing action of the EGR gas, that is, low temperature combustion is performed and as a result the hydrocarbons do not grow into soot.

This low temperature combustion is characterized in that it is possible to reduce the amount of generation of $NO_x$ while suppressing the generation of smoke regardless of the air-fuel ratio. That is, if the air-fuel ratio is made rich, the fuel becomes in excess, but since the combustion temperature is kept to a low temperature, the excess fuel does not grow into soot and therefore no smoke is generated. Further, only a very small amount of $NO_x$ is generated at this time. On the other hand, when the mean air-fuel ratio is lean or when the air-fuel ratio is the stoichiometric air-fuel ratio, if the combustion temperature becomes high, a small amount of soot is produced, but under low temperature combustion, the combustion temperature is kept to a low temperature, so no smoke at all is produced and only a very small amount of $NO_x$ is produced as well.

On the other hand, if performing low temperature combustion, the temperature of the fuel and its surrounding gas becomes low, but the temperature of the exhaust gas rises. This will be explained with reference to FIGS. 14A and 14B.

Figure 14A:
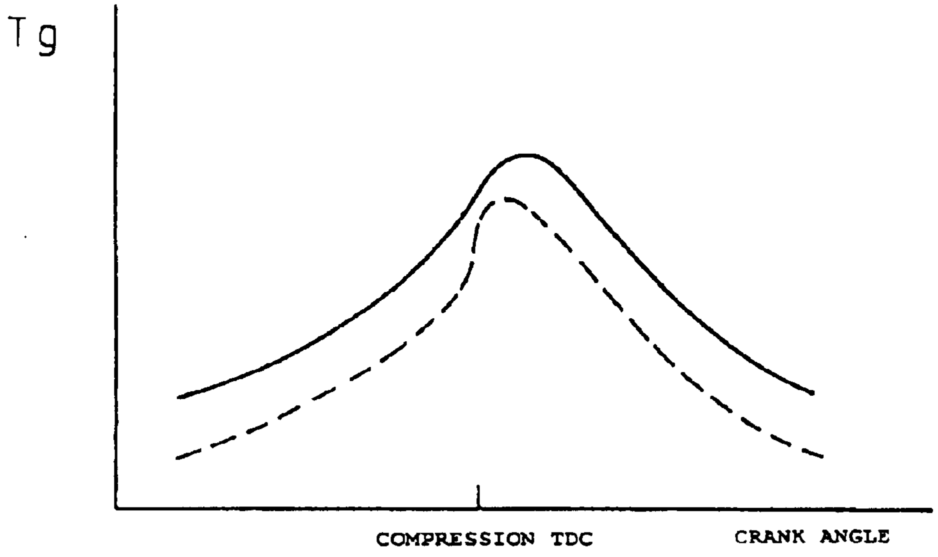
FIGS. 14A and 14B are views of the temperature of gas in the combustion chamber.
Figure 14B:
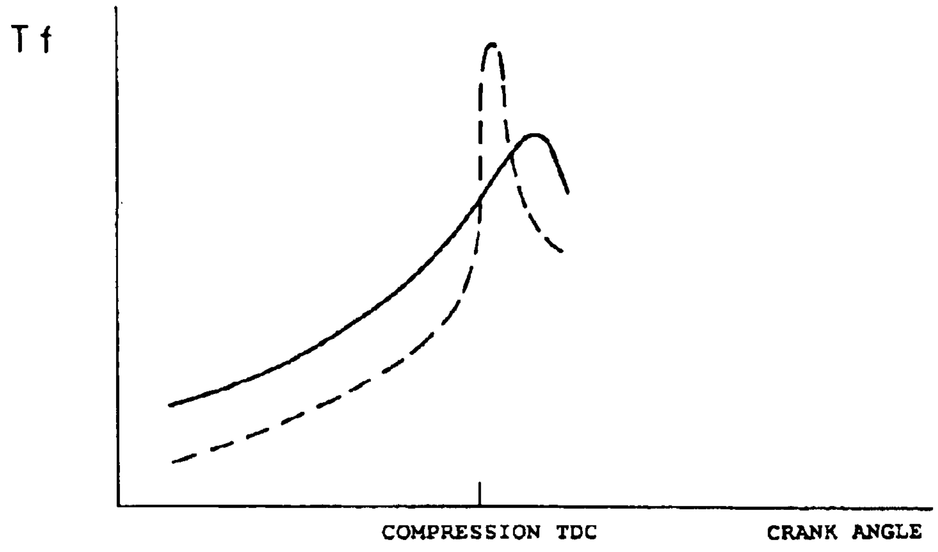

The solid line in FIG. 14A shows the relationship between the mean gas temperature Tg in the combustion chamber 5 and the crank angle at the time of low temperature combustion, while the broken line in FIG. 14A shows the relationship between the mean gas temperature Tg in the combustion chamber 5 and the crank angle at the time of ordinary combustion. Further, the solid line in FIG. 14B shows the relationship between the temperature Tf of the fuel and its surrounding gas and the crank angle at the time of low temperature combustion, while the broken line in FIG. 14B shows the relationship between the temperature Tf of the fuel and its surrounding gas and the crank angle at the time of ordinary combustion.

The amount of EGR gas is greater at the time of low temperature combustion than compared with the time of ordinary combustion. Therefore, as shown in FIG. 14A, before top dead center of the compression stroke, that is, during the compression stroke, the mean gas temperature Tg at the time of low temperature combustion shown by the solid line becomes higher than the mean gas temperature Tg at the time of ordinary combustion shown by the broken line. Note that at this time, as shown in FIG. 14B, the temperature Tf of the fuel and its surrounding gas becomes substantially the same temperature as the mean gas temperature Tg.

Next, combustion near the top dead center of the compression stroke is started. In this case, at the time of low temperature combustion, the temperature Tf of the fuel and its surrounding gas does not become that high as shown by the solid line of FIG. 14B. As opposed to this, at the time of ordinary combustion, there is a large amount of oxygen around the fuel, so as shown by the broken line in FIG. 14B, the temperature Tf of the fuel and its surrounding gas becomes extremely high. When performing ordinary combustion in this way, the temperature Tf of the fuel and its surrounding gas becomes considerably higher than the time of low temperature combustion, but the temperature of the rest of the gas, which is in the majority, becomes lower at the time of normal combustion compared with the time of low temperature combustion. Therefore, as shown in FIG. 14A, the mean gas temperature Tg in the combustion chamber 5 near the top dead center of the compression stroke becomes higher at the time of low temperature combustion than ordinary combustion. As a result, as shown in FIG. 14A, the temperature of the burned gas in the combustion chamber 5 after the end of combustion becomes higher at the time of low temperature combustion than ordinary combustion. Therefore, if low temperature combustion is performed, the temperature of the exhaust gas becomes high.

If low temperature combustion is performed in this way, the amount of smoke generated, that is, the amount M of discharged particulate, becomes smaller and the temperature of the exhaust gas rises. Therefore, if switching from ordinary combustion to low temperature combustion when M>G, the amount M of discharged particulate falls, the temperature TF of the particulate filter 22 rises, and the amount G of particulate removable by oxidation increases, it is possible to achieve a state where M<G. When using this low temperature combustion, if it is determined at step 106 of FIG. 11 that M>G, low temperature combustion is switched to at step 109. When it is determined next at step 108 that M<G−β, ordinary combustion is switched to at step 110.

Figure 15:
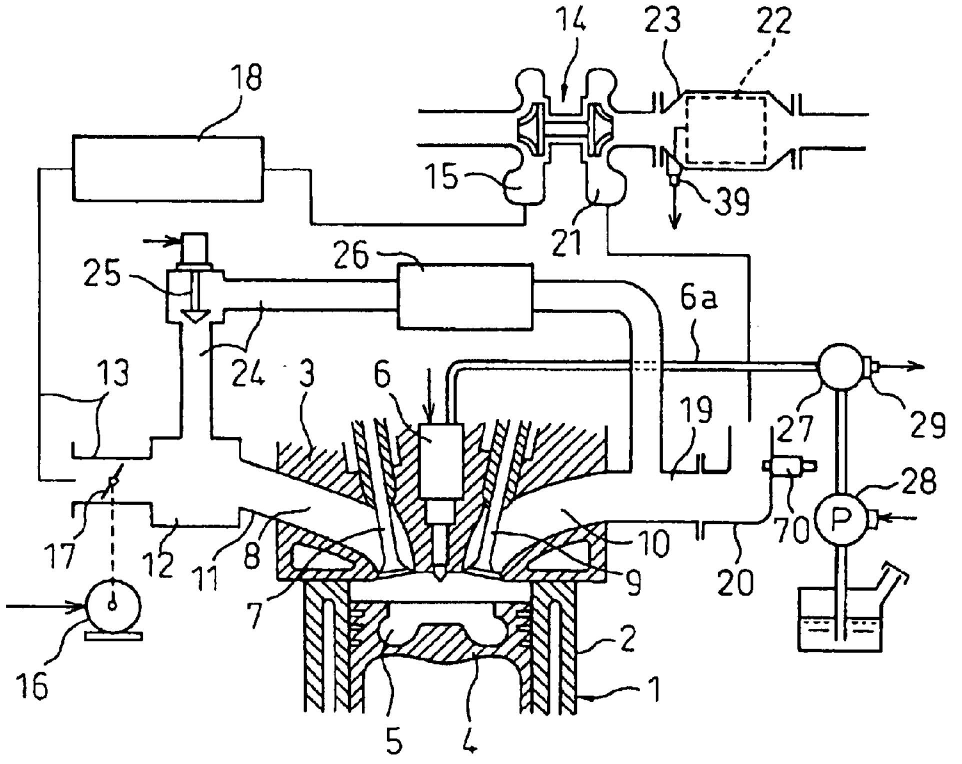
FIG. 15 is an overall view of another embodiment of an engine.

Next, an explanation will be given of another method for raising the temperature TF of the particulate filter 22 to realize a state where M<G. FIG. 15 shows an engine suited for execution of this method. Referring to FIG. 15, in this engine, a hydrocarbon feed device 70 is arranged in the exhaust pipe 20. In this method, when it is determined that M>G at step 106 of FIG. 11, hydrocarbon is fed from the hydrocarbon feed device 70 to the inside of the exhaust pipe 20 at step 109. The hydrocarbon is oxidized by the excess oxygen on the particulate filter 22. Due to the heat of oxidation reaction at this time, the temperature TF of the particulate filter 22 is raised. Next, when it is determined that M<G−β at step 108 of FIG. 11, the supply of hydrocarbon from the hydrocarbon feed device 170 is stopped at step 110. Note that this hydrocarbon feed device 70 may be arranged anywhere between the particulate filter 22 and the exhaust port 10.

Figure 16:
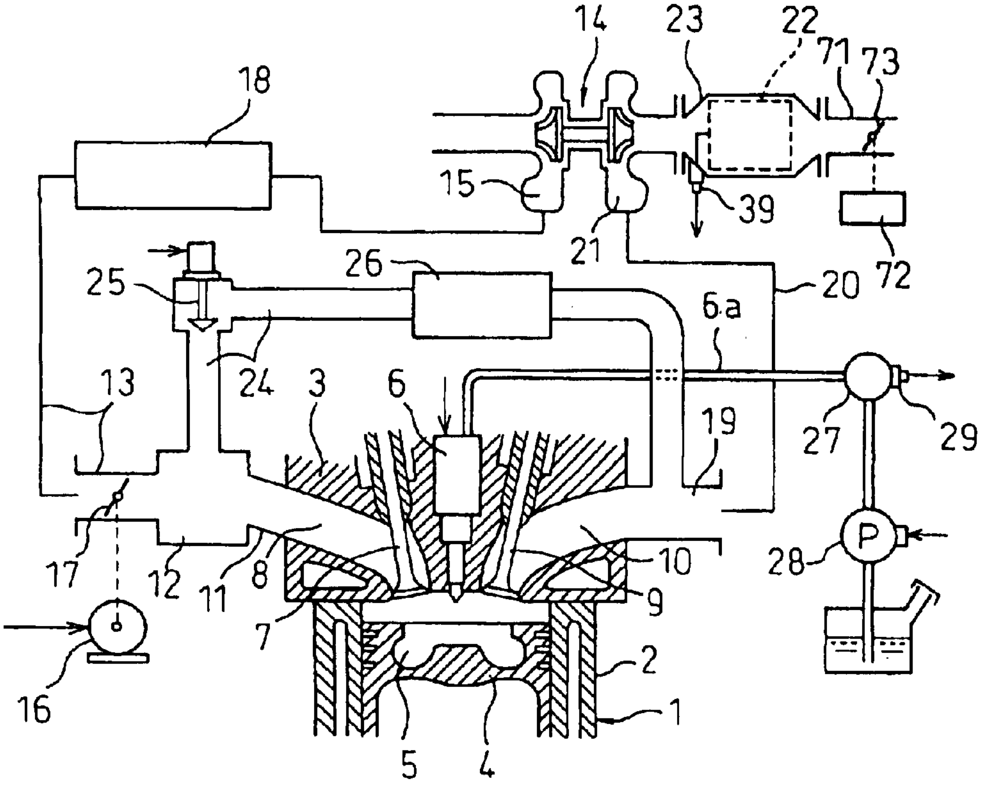
FIG. 16 is an overall view of still another embodiment of an engine.

Next, an explanation will be given of still another method for raising the temperature TF of the particulate filter 22 to make M<G. FIG. 16 shows an engine suited for execution of this method. Referring to FIG. 16, in this engine, an exhaust control valve 73 driven by an actuator 72 is arranged in the exhaust pipe 71 downstream of the particulate filter 22.

In this method, when it is determined at step 106 of FIG. 11 that M>G, the exhaust control valve 73 is made substantially fully closed at step 109. To prevent a reduction in the engine output torque due to the exhaust control valve 73 being substantially fully closed, the amount of injection of main fuel $Q_m$ is increased. If the exhaust control valve 73 is substantially fully closed, the pressure in the exhaust passage upstream of the exhaust control valve 73, that is, the back pressure, rises. If the back pressure rises, when exhaust gas is discharged from the inside of the combustion chamber 5 to the inside of the exhaust port 10, the pressure of the exhaust gas does not fall that much. Therefore, the temperature no longer falls that much. Further, at this time, since the amount of injection of main fuel $Q_m$ is increased, the temperature of the already burned gas in the combustion chamber 5 becomes high. Therefore, the temperature of the exhaust gas exhausted into the exhaust port 10 becomes considerably high. As a result, the temperature of the particulate filter 22 is made to rapidly rise.

Next, if it is determined at step 108 of FIG. 11 that M<G−β, the exhaust control valve 73 is made to fully open and the action of increasing the amount of injection of the main fuel $Q_m$ is stopped at step 110.

Figure 17:
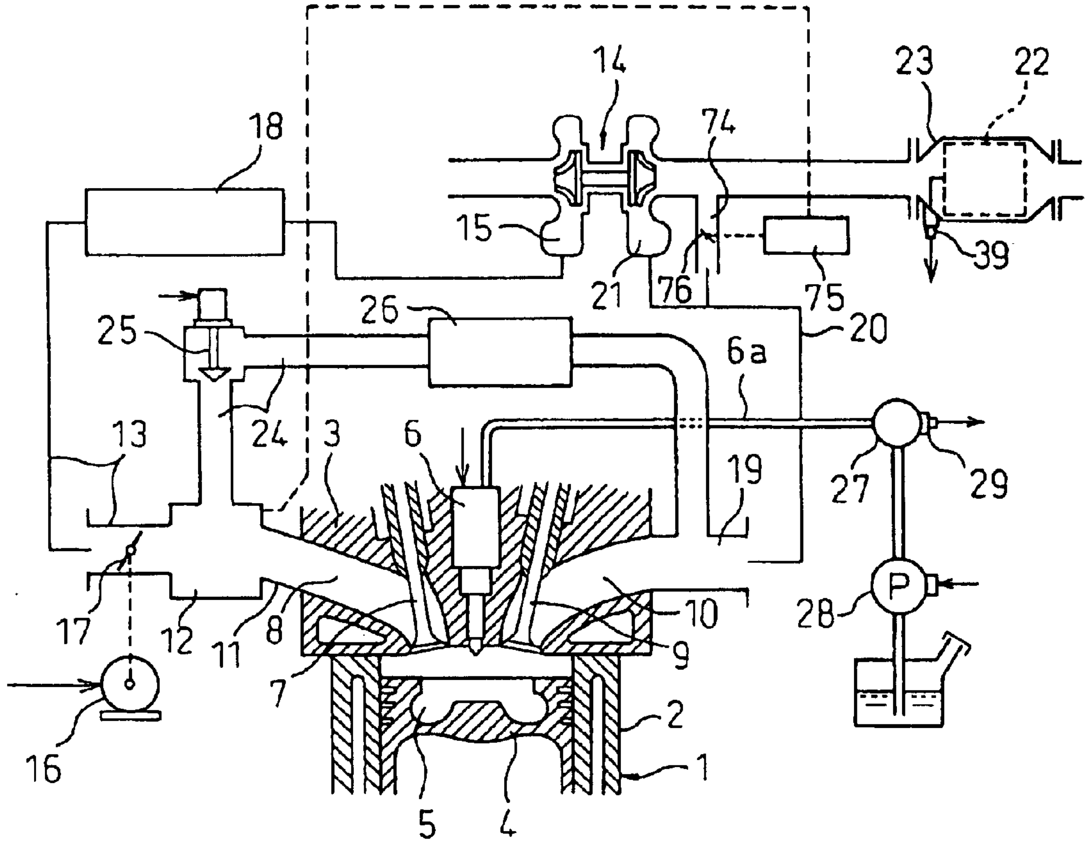
FIG. 17 is an overall view of still another embodiment of an engine.

Next, an explanation will be given of still another method for raising the temperature TF of the particulate filter 22 to make M<G. FIG. 17 shows an engine suited to execution of this method. Referring to FIG. 17, in this engine, a waist gate valve 76 controlled by an actuator 75 is arranged inside the exhaust bypass passage 74 bypassing the exhaust turbine 21. This actuator 75 is normally actuated in response to the pressure inside the surge tank 12, that is, the supercharging pressure, and controls the opening degree of the waist gate valve 76 so that the supercharging pressure does not become more than a certain value.

In this method, when it is determined at step 106 of FIG. 11 that M>G, the waist gate valve 76 is fully opened at step 109. If the exhaust gas passes through the exhaust turbine 21, the temperature falls, but if the waist gate valve 76 is fully opened, the large portion of the exhaust gas flows through the exhaust bypass passage 74, so the temperature no longer falls. Therefore, the temperature of the particulate filter 22 rises. Next, if it is determined at step 108 of FIG. 11 that M<G−β, the waist gate valve 76 is made to open and the opening degree of the waist gate valve 76 is controlled so that the supercharging pressure does not exceed a certain pressure at step 110.

Next, an explanation will be given of the method of reducing the amount M of discharged particulate for making M<G. That is, the more sufficiently the injected fuel and the air are mixed, that is, the greater the amount of air around the injected fuel, the better the injected fuel is burned, so the less particulate is produced. Therefore, to reduce the amount M of discharged particulate, it is sufficient to more sufficiently mix the injected fuel and air. If the injected fuel and air are mixed well, however, the amount of generation of $NO_x$ increases since the combustion becomes active. Therefore, in other words, the method of reducing the amount M of discharged particulate may be said to be a method of increasing the amount of generation of NO.

Whatever the case, there are various methods for reducing the amount PM of discharged particulate. Therefore, these methods will be successively explained.

It is also possible to use the above-mentioned low temperature combustion as a method for reducing the amount PM of discharged particulate, but the method of controlling the fuel injection may also be mentioned as another effective method. For example, if the amount of fuel injection is reduced, sufficient air becomes present around the injected fuel and therefore the amount M of discharged particulate is reduced.

Further, if the injection timing is advanced, sufficient air becomes present around the injected fuel and therefore the amount M of discharged particulate is reduced. Further, if the fuel pressure in the common rail 27, that is, the injection pressure, is raised, the injected fuel is dispersed, so the mixture between the injected fuel and the air becomes good and therefore the amount M of discharged particulate is reduced. Further, when auxiliary fuel is injected at the end of the compression stroke immediately before injection of the main fuel $Q_m$, that is, when so-called pilot injection is performed, the air around the fuel $Q_m$ becomes insufficient since the oxygen is consumed by the combustion of the auxiliary fuel. Therefore, in this case, the amount M of discharged particulate is reduced by stopping the pilot injection.

That is, when controlling the fuel injection to reduce the amount M of discharged particulate, if it is determined at step 106 of FIG. 11 that M>G, at step 109, either the amount of fuel injection is reduced, the fuel injection timing is advanced, the injection pressure is raised, or the pilot injection is stopped so as to reduce the amount M of discharged particulate. Next, when it is determined at step 108 of FIG. 11 that M<G−β, the original state of injection of fuel is restored to at step 110.

Next, an explanation will be given of another method for reducing the amount M of discharged particulate for making M<G. In this method, when it is determined at step 106 of FIG. 11 that M>G, the opening degree of the EGR control valve 25 is reduced to reduce the EGR rate. If the EGR rate falls, the amount of air around the injected fuel increases and therefore the amount M of discharged particulate falls. Next, when it is determined at 108 of FIG. 11 that M<G−β, the EGR rate is raised to the original EGR rate at step 110.

Next, an explanation will be given of still another method for reducing the amount M of discharged particulate for making M<G. In this method, when it is determined at step 106 of FIG. 11 that M>G, the opening degree of the waist gate valve 76 (FIG. 17) is reduced to increase the supercharging pressure. If the supercharging pressure increases, the amount of air around the injected fuel increases and therefore the amount M of discharged particulate falls. Next, when it is determined at step 108 of FIG. 11 that M<G−β, the supercharging pressure is restored to the original supercharging pressure at step 110.

Next, an explanation will be given of the method for increasing the concentration of oxygen in the exhaust gas for making M<G. If the concentration of oxygen in the exhaust gas increases, the amount G of particulate removable by oxidation is increased by that alone, but since the amount of oxygen absorbed in the active oxygen release agent 61 increases, the amount of active oxygen released from the active oxygen release agent 61 increases and therefore the amount G of the particulate removable by oxidation increases.

As a method for executing this method, the method of controlling the EGR rate may be mentioned. That is, when it is determined at step 106 of FIG. 11 that M>G, the opening degree of the EGR control valve 25 is reduced so that the EGR rate falls at step 109. The fall of the EGR rate means that the ratio of the amount of intake air in the intake air increases. Therefore, if the EGR rate falls, the concentration of oxygen in the exhaust gas rises. As a result, the amount G of particulate removable by oxidation increases. Further, if the EGR rate falls, as mentioned above, the amount M of discharged particulate falls. Therefore, if the EGR rate falls, the state where M<G is rapidly reached. Next, when it is determined at step 108 of FIG. 11 that M<G−β, the EGR is restored to the original EGR rate at step 110.

Next, an explanation will be given of the method of using secondary air for increasing the concentration of oxygen in exhaust gas. In the example shown in FIG. 18, the exhaust pipe 77 between the exhaust turbine 21 and the particulate filter 22 is connected with the intake duct 13 through a secondary air feed conduit 78, while a feed control valve 79 is arranged in the secondary air feed conduit 78. Further, in the example shown in FIG. 19, the secondary air feed conduit 78 is connected to an engine driven air pump 80. Note that the position for feeding secondary air into the exhaust passage may be anywhere between the particulate filter 22 and the exhaust port 10.

Figure 18:
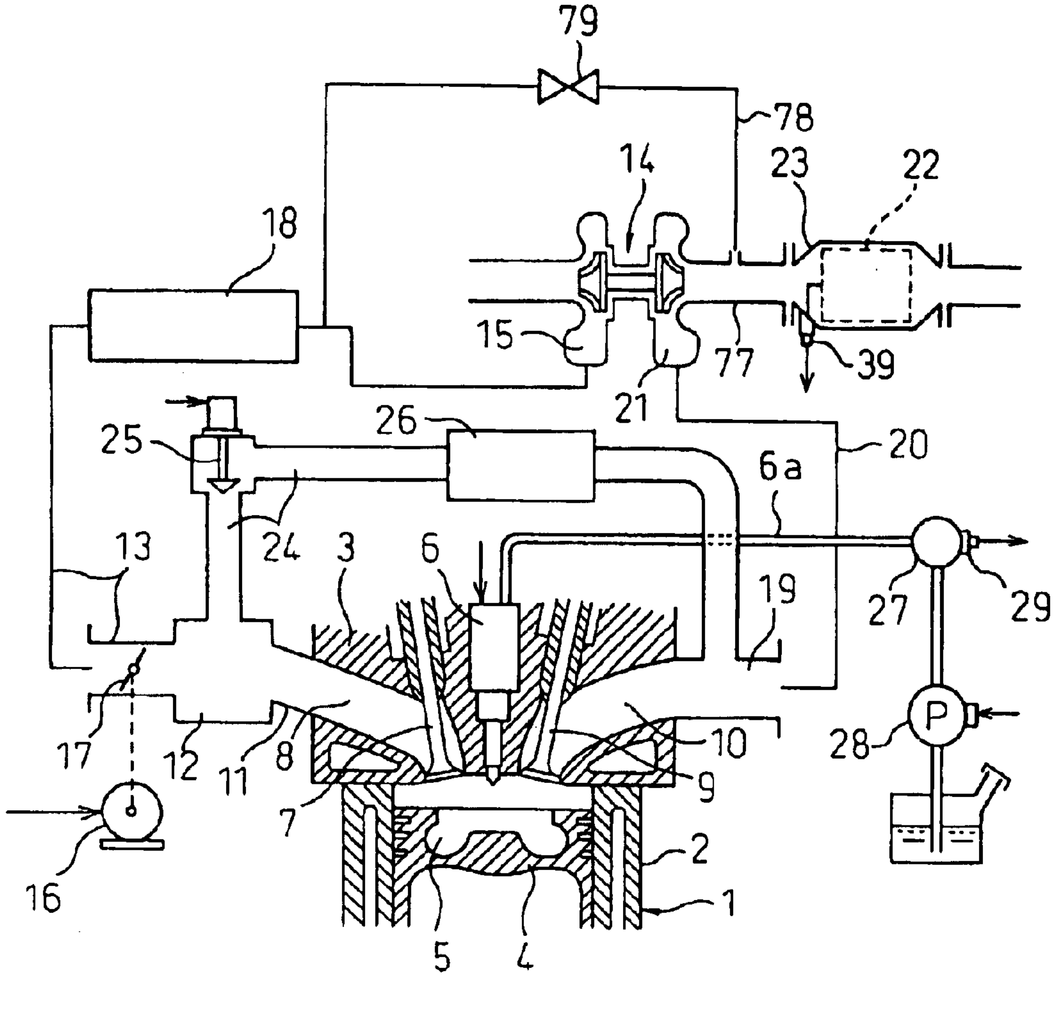
FIG. 18 is an overall view of still another embodiment of an engine.
Figure 19:
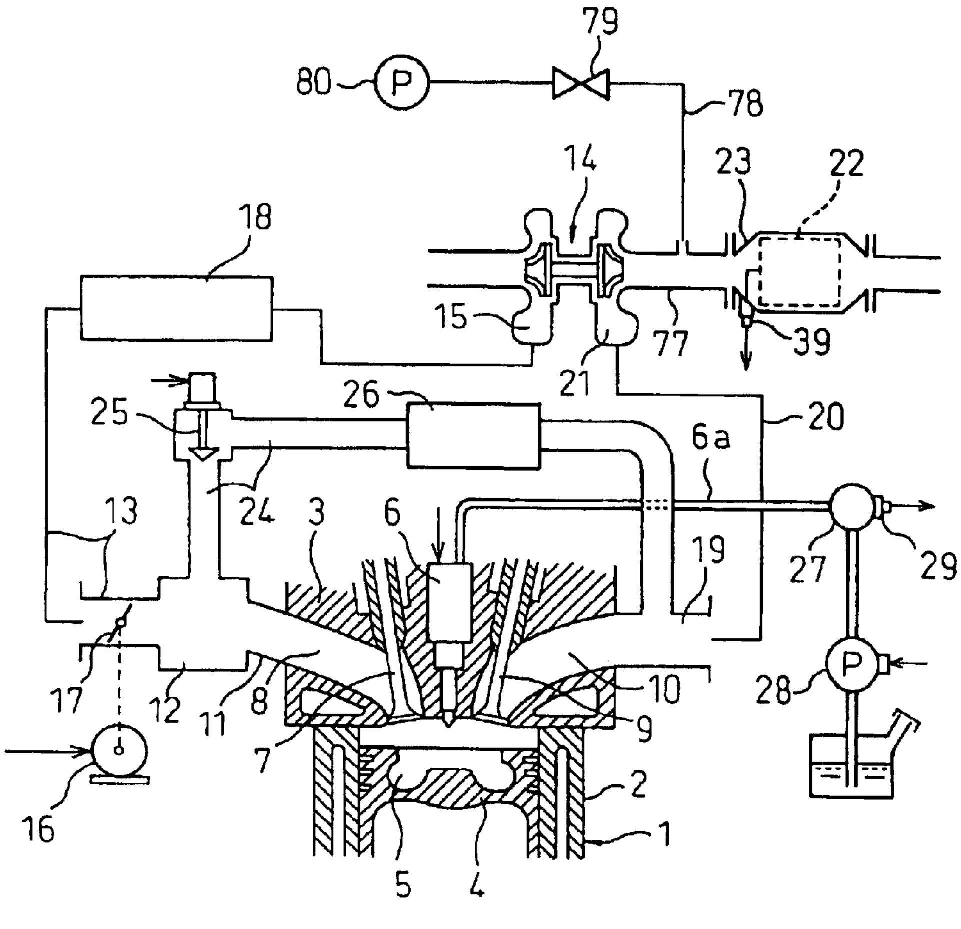
FIG. 19 is an overall view of still another embodiment of an engine.

In the engine shown in FIG. 18 or FIG. 19, when it is determined at step 106 of FIG. 11 that M>G, the feed control valve 79 is made to open at step 109. As a result, secondary air is supplied from the secondary air feed conduit 78 to the exhaust pipe 77. Therefore, the concentration of oxygen in the exhaust gas is increased. Next, when it is determined at step 108 of FIG. 11 that M<G−β, the feed control valve 79 is made to close at step 110.

Next, an explanation will be given of an embodiment where the amount GG of particulate removed by oxidation which can be oxidized per unit time on the particulate filter 22 is successively calculated and at least one of the amount M of discharged particulate and the amount GG of particulate removed by oxidation is controlled so that M<GG when the amount M of discharged particulate exceeds the calculated amount GG of particulate removed by oxidation.

As explained above, when particulate deposits on the particulate filter 22, it can be oxidized in a short time, but before that particulate is completely removed by oxidation, other particulate successively deposits on the particulate filter 22. Therefore, in actuality, a certain amount of particulate is always depositing on the particulate filter 22 and part of the particulate in this depositing particulate is removed by oxidation. In this case, if the particulate GG able to be removed by oxidation per unit time is the same as the amount M of discharged particulate, all of the particulate in the exhaust gas can be removed by oxidation on the particulate filter 22. However, when the amount M of discharged particulate becomes greater than the amount GG of particulate removed by oxidation per unit time, the amount of particulate deposited on the particulate filter 22 gradually increases and finally the particulate deposits in layers and ignition at a low temperature becomes no longer possible.

In this way, if the amount M of discharged particulate becomes the same as the amount GG of particulate removed by oxidation or smaller than the amount GG of particulate removed by oxidation, it is possible to remove by oxidation all of the particulate in the exhaust gas on the particulate filter 22. Therefore, in this embodiment, when the amount M of discharged particulate exceeds the amount GG of particulate removed by oxidation, the temperature TF of the particulate filter 22 or the amount M of discharged particulate etc. is controlled so that M<GG.

Note that the amount GG of particulate removed by oxidation can be expressed as follows:

$$GG(g/sec)=C\cdot EXP(-E/RT)\cdot[PM]^1\cdot([O_2]^m+[NO]^n)$$

Here, C is a constant, E is the activation energy, R is a gas constant, T is the temperature TF of the particulate filter 22, [PM] is the concentration of deposition (mol/$cm^2$) of particulate on the particulate filter 22, $[O_2]$ is the concentration of oxygen in the exhaust gas, and [NO] is the concentration of $NO_x$ in the exhaust gas.

Note that the amount GG of particulate removed by oxidation actually is a function of the concentration of unburned HC in the exhaust gas, the degree of ease of oxidation of the particulate, the spatial velocity of the flow of exhaust gas in the particulate filter 22, the exhaust gas pressure, etc., but here these effects will not be considered.

Figure 20A:
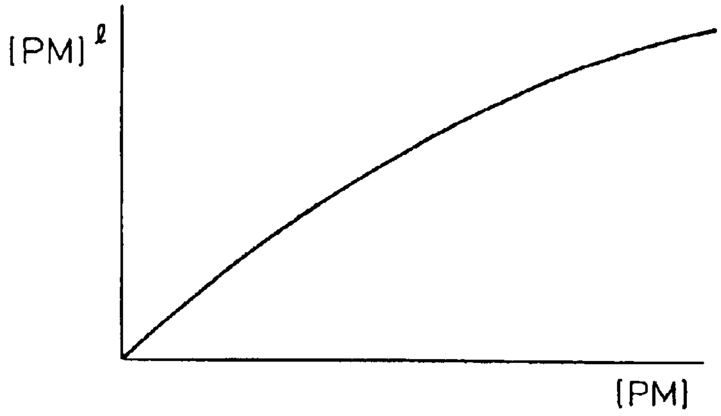
FIGS. 20A to 20C are views of concentration of deposition of particulate etc.

As will be understood from the above, the amount GG of particulate removed by oxidation increases exponentially when the temperature TF of the particulate filter 22 rises. Further, if the concentration of deposition [PM] of the particulate increases, the particulate removed by oxidation increases, so the higher the [PM], the greater the amount GG of particulate removed by oxidation. However, the higher the concentration of deposition [PM] of the particulate, the greater the amount of particulate deposited at hard to oxidize positions, so the rate of increase of the amount GG of particulate removed by oxidation gradually falls. Therefore, the relationship between the concentration of deposition [PM] of particulate and the $[PM]^1$ in the above formula becomes as shown in FIG. 20A.

Figure 20B:
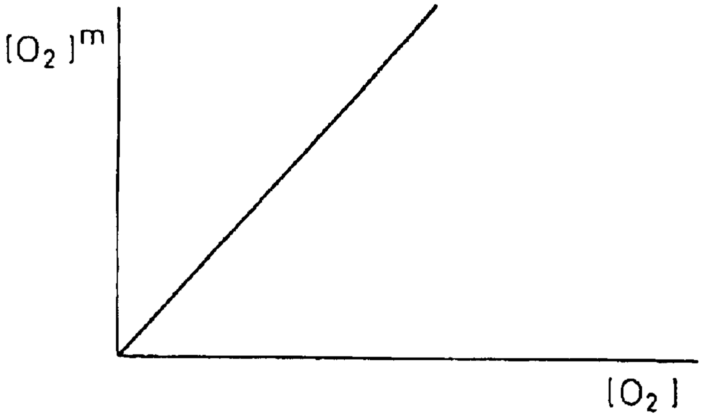

On the other hand, if the concentration of oxygen $[O_2]$ in the exhaust gas becomes higher, as explained above, the amount GG of particulate removed by oxidation increases by that alone, but additionally the amount of active oxygen released from the active oxygen release agent 61 increases. Therefore, if the concentration of oxygen $[O_2]$ in the exhaust gas becomes higher, the amount GG of particulate removed by oxidation increases in proportion and therefore the relationship between the concentration of oxygen $[O_2]$ in the exhaust gas and the $[O_2]^m$ in the above formula becomes as shown in FIG. 20B.

Figure 20C:
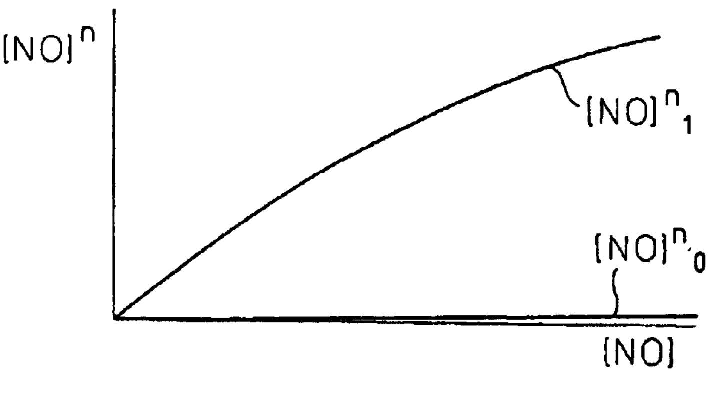

On the other hand, if the concentration [NO] of $NO_x$ in the exhaust gas becomes higher, as explained above, the amount of generation of $NO_2$ increases, so the amount GG of particulate removed by oxidation increases. The conversion from NO to $NO_2$, however, only occurs when the temperature of the exhaust gas is between about 250° C. to about 450° C. Therefore, the relationship between the concentration [NO] of $NO_x$ in the exhaust gas and the $[NO]^n$ in the above formula becomes one where the $[NO]^n$ increases along with an increase in the [NO] as shown by the solid line $[NO]^n_1$ of FIG. 20C when the temperature of the exhaust gas is between about 250° C. to about 450° C., while $[NO]^n_0$ becomes about zero regardless of the [NO] as shown by the solid line $[NO]^n_0$ of FIG. 20C when the temperature of the exhaust gas is less than about 250° C. or more than about 450° C.

In this embodiment, the amount GG of particulate removed by oxidation is calculated based on the above formula with the elapse of every certain time interval. If the amount of particulate deposited at this time is made PM(g), the particulate corresponding to the amount GG of particulate removed by oxidation in that particulate PM is removed and particulate corresponding to the amount M of discharged particulate is newly deposited on the particulate filter 22. Therefore, the final amount of deposition of particulate is expressed by the following:

$$PM+M-GG$$

Next, an explanation will be given of the method of control of operation while referring to FIG. 21.

Figure 21:
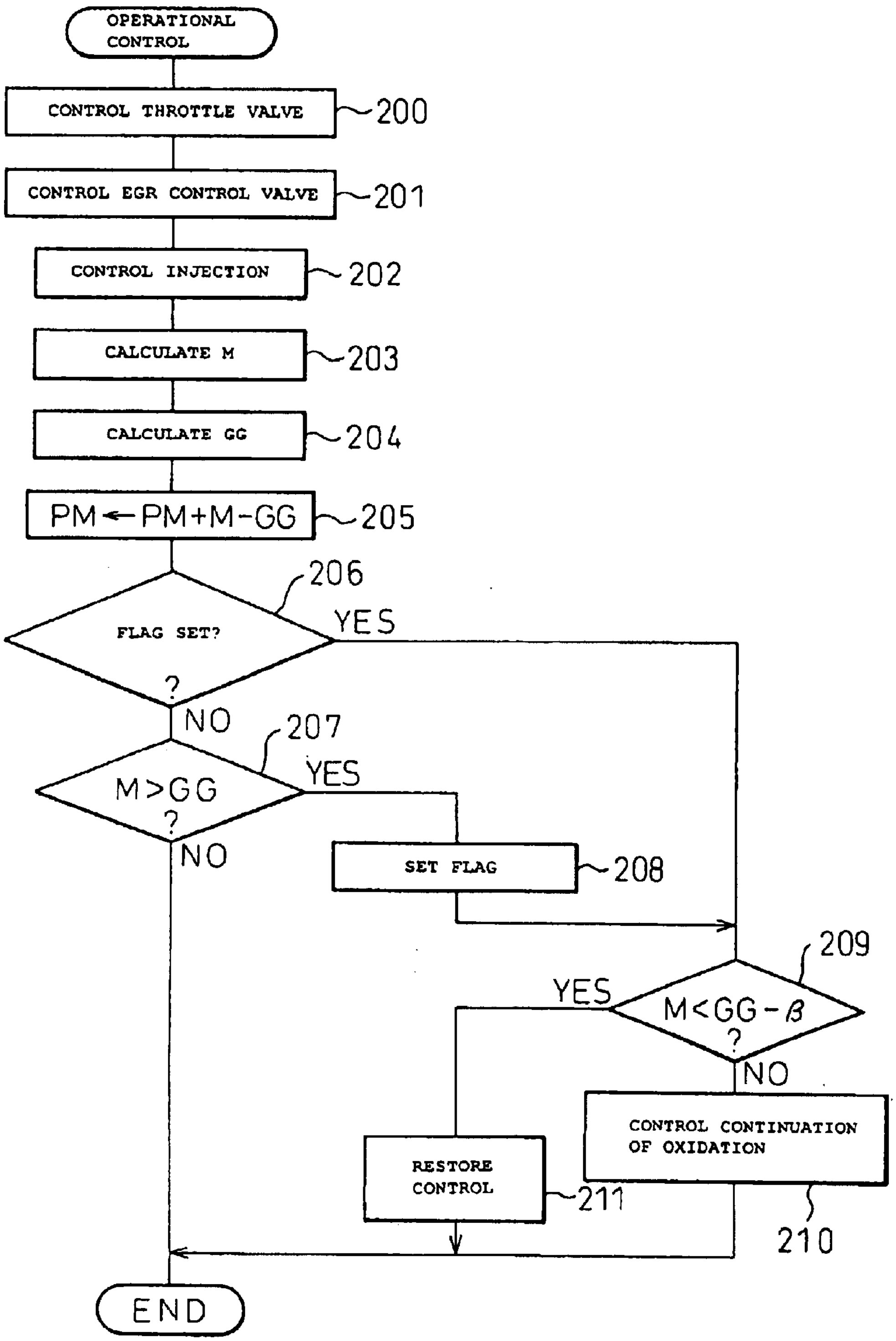
FIG. 21 is a flow chart for control of engine operation.

Referring to FIG. 21, first, at step 200, the opening degree of the throttle valve 17 is controlled. Next, at step 201, the opening degree of the EGR control valve 25 is controlled. Next, at step 202, the injection from the fuel injector 6 is controlled. Next, at step 203, the amount M of discharged particulate is calculated from the map shown in FIG. 10B. Next, at step 204, the amount GG of particulate removed by oxidation is calculated based on the following:

$$GG=C\cdot EXP(-E/RT)\cdot[PM]^1\cdot([O_2]^m+[NO]^n)$$

Next, at step 205, the final amount PM of deposition of the particulate is calculated based on the following:

$$PM\leftarrow PM+M-GC$$

Next, at step 206, it is determined if a flag indicating that the amount M of discharged particulate has become larger than the amount GG of particulate removed by oxidation has been set. When the flag has not been set, the routine proceeds to step 207, where it is determined if the amount M of discharged particulate has become larger than the amount GG of particulate removed by oxidation. When $M\leqq GG$, that is, when the amount M of discharged particulate is less than the amount GG of particulate removed by oxidation, the processing cycle is ended.

As opposed to this, when it is determined at step 207 that M>GG, that is, when the amount M of discharged particulate becomes greater than the amount GG of particulate which can be removed by oxidation, the routine proceeds to step 208, where the flag is set, then proceeds to step 209. When the flag is set, at the next processing cycle, the routine jumps from step 206 to step 209.

At step 209, the amount M of discharged particulate and a control release value (GG−β), obtained by subtracting a certain value β from the amount GG of particulate removed by oxidation, are compared. When M≧GG−β, that is, when the amount M of discharged particulate is larger than the control release value (GG−β), the routine proceeds to step 210, where control for continuation of the action of oxidation of the particulate at the particulate filter 22, that is, control for raising the temperature TF of the particulate filter 22, control for reducing the amount M of discharged particulate, or control for raising the concentration of oxygen in the exhaust gas is performed.

Next, when it is determined at step 209 that M<GG−β, that is, when the amount M of discharged particulate becomes less than the control release value (GG−β), the routine proceeds to step 211, where control is performed to gradually restore the operating state to the original operating state and where the flag is reset.

Note that in the embodiments explained above, a layer of a carrier comprised of alumina is for example formed on the two side surfaces of the partitions 54 of the particulate filter 22 and the inside walls of the fine holes in the partitions 54. A precious metal catalyst and active oxygen release agent are carried on this carrier. Further, the carrier may carry an $NO_x$ absorbent which absorbs the $NO_x$ contained in the exhaust gas when the air-fuel ratio of the exhaust gas flowing into the particulate filter 22 is lean and releases the absorbed $NO_x$ when the air-fuel ratio of the exhaust gas flowing into the particulate filter 22 becomes the stoichiometric air-fuel ratio or rich.

In this case, as explained above, according to the present invention, platinum Pt is used as the precious metal catalyst. As the $NO_x$ absorbent, use is made of at least one of an alkali metal such as potassium K, sodium Na, lithium Li, cesium Cs, and rubidium Rb, an alkali earth metal such as barium Ba, calcium Ca, and strontium Sr, and a rare earth such as lanthanum La and yttrium Y. Note that as will be understood by a comparison with the metal comprising the above active oxygen release agent, the metal comprising the $NO_x$ absorbent and the metal comprising the active oxygen release agent match in large part.

In this case, it is possible to use different metals or to use the same metal as the $NO_x$ absorbent and the active oxygen release agent. When using the same metal as the $NO_x$ absorbent and the active oxygen release agent, the function as a $NO_x$ absorbent and the function of an active oxygen release agent are simultaneously exhibited.

Next, an explanation will be given of the action of absorption and release of $NO_x$ taking as an example the case of use of platinum Pt as the precious metal catalyst and use of potassium K as the $NO_x$ absorbent.

First, considering the action of absorption of $NO_x$, the $NO_x$ is absorbed in the $NO_x$ absorbent by the same mechanism as the mechanism shown in FIG. 4A. However, in this case, in FIG. 4A, reference numeral 61 indicates the $NO_x$ absorbent.

That is, when the air-fuel ratio of the exhaust gas flowing into the particulate filter 22 is lean, since a large amount of excess oxygen is contained in the exhaust gas, if the exhaust gas flows into the exhaust gas inflow passages 50 of the particulate filter 22, as shown in FIG. 4A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO+O_2 \rightarrow 2NO_2$). Next, part of the $NO_2$ which is produced is absorbed in the $NO_x$ absorbent 61 while being oxidized on the platinum Pt and diffuses in the $NO_x$ absorbent 61 in the form of nitrate ions $NO_3^-$ as shown in FIG. 4A while bonding with the potassium K. Part of the nitrate ions $NO_3^-$ produces potassium nitrate $KNO_3$. In this way, NO is absorbed in the $NO_x$ absorbent 61.

On the other hand, when the exhaust gas flowing into the particulate filter 22 becomes rich, the nitrate ions $NO_3^-$ are broken down into oxygen O and NO and then NO is successively released from the $NO_x$ absorbent 61. Therefore, when the air-fuel ratio of the exhaust gas flowing into the particulate filter 22 becomes rich, the NO is released from the $NO_x$ absorbent 61 in a short time. Further, the released NO is reduced, so no NO is discharged into the atmosphere.

Note that in this case, even if the air-fuel ratio of the exhaust gas flowing into the particulate filter 22 is the stoichiometric air-fuel ratio, NO is released from the $NO_x$ absorbent 61. In this case, however, since the NO is only released gradually from the $NO_x$ absorbent 61, it takes a somewhat long time for all of the $NO_x$ absorbed in the $NO_x$ absorbent 61 to be released.

As explained above, however, it is possible to use different metals for the $NO_x$ absorbent and the active oxygen release agent or possible to use the same metal for the $NO_x$ absorbent and the active oxygen release agent. If the same metal is used for the $NO_x$ absorbent and the active oxygen release agent, as explained earlier, the function of the $NO_x$ absorbent and the function of the active oxygen release agent are performed simultaneously. An agent which performs these two functions simultaneously will be called an active oxygen release agent/$NO_x$ absorbent from here on. In this case, reference numeral 61 in FIG. 4A shows an active oxygen release agent/$NO_x$ absorbent.

When using such an active oxygen release agent/$NO_x$ absorbent 61, when the air-fuel ratio of the exhaust gas flowing into the particulate filter 22 is lean, the NO contained in the exhaust gas is absorbed in the active oxygen release agent/$NO_x$ absorbent 61. If the particulate contained in the exhaust gas adheres to the active oxygen release agent/$NO_x$ absorbent 61, the particulate is removed by oxidation in a short time by the active oxygen contained in the exhaust gas and the active oxygen released from the active oxygen release agent/$NO_x$ absorbent 61. Therefore, at this time, it is possible to prevent the discharge of both the particulate and $NO_x$ in the exhaust gas into the atmosphere.

On the other hand, when the air-fuel ratio of the exhaust gas flowing into the particulate filter 22 becomes rich, NO is released from the active oxygen release agent/$NO_x$ absorbent 61. This NO is reduced by the unburned hydrocarbons and CO and therefore no NO is discharged into the atmosphere at this time as well. Further, when the particulate is deposited on the particulate filter 22, it is removed by oxidation by the active oxygen released from the active oxygen release agent/$NO_x$ absorbent 61.

Note that when an $NO_x$ absorbent or active oxygen release agent/$NO_x$ absorbent is used, the air-fuel ratio of the exhaust gas flowing into the particulate filter 22 is made temporarily rich so as to release the $NO_x$ from the $NO_x$ absorbent or the active oxygen release agent/$NO_x$ absorbent before the absorption ability of the $NO_x$ absorbent or the active oxygen release agent/$NO_x$ absorbent becomes saturated.

Further, the present invention can also be applied to the case where only a precious metal such as platinum Pt is carried on the layer of the carrier formed on the two surfaces of the particulate filter 22. In this case, however, the solid line showing the amount G of particulate removable by oxidation shifts somewhat to the right compared with the solid line shown in FIG. 5. In this case, active oxygen is released from the $NO_2$ or $SO_3$ held on the surface of the platinum Pt.

Further, it is also possible to use as the active oxygen release agent a catalyst able to adsorb and hold $NO_2$ or $SO_3$ and release active oxygen from this adsorbed $NO_2$ or $SO_3$.

Note that the present invention can also be applied to an exhaust gas purification apparatus designed to arrange an oxidation catalyst in the exhaust passage upstream of the particulate filter, convert the NO in the exhaust gas to $NO_2$ by this oxidation catalyst, cause the $NO_2$ and the particulate deposited on the particulate filter to react, and use this $NO_2$ to oxidize the particulate.

What is claimed is:

1. An exhaust gas purification method using a particulate filter for removing particulate in exhaust gas discharged from a combustion chamber, said particulate filter able to remove by oxidation any particulate in exhaust gas flowing into the particulate filter without emitting a luminous flame, the method comprising:

calculating the amount of particulate removable by oxidation on the particulate filter per unit time without emitting a luminous flame, and when an amount of the discharged particulate discharged from the combustion chamber per unit time is smaller than said amount of particulate removable by oxidation on the particulate filter per unit time, removing the particulate removable by oxidation without emitting a luminous flame, and when the amount of discharged particulate exceeds said amount of particulate removable by oxidation, controlling at least one of the amount of discharged particulate or the amount of particulate removable by oxidation so that the amount of discharged particulate becomes less than said amount of particulate removable by oxidation.

2. An exhaust gas purification method as set forth in claim 1, wherein a precious metal catalyst is carried on the particulate filter.

3. An exhaust gas purification method as set forth in claim 2, wherein an active oxygen release agent is carried on the particulate filter, said active oxygen release agent able to take in and hold oxygen when excess oxygen is present in the surroundings and release the held oxygen in the form of active oxygen when the concentration of oxygen in the surroundings falls, and wherein when the particulate adheres on the particulate filter, active oxygen is released from the active oxygen release agent and the particulate adhered on the particulate filter is oxidized by the released active oxygen.

4. An exhaust gas purification method as set forth in claim 3, wherein the active oxygen release agent is comprised of a member selected from the group consisting of an alkali metal, an alkali earth metal, a rare earth, and a transition metal.

5. An exhaust gas purification method as set forth in claim 4, wherein the alkali metal and alkali earth metal are comprised of metals having a higher tendency toward ionization than calcium.

6. An exhaust gas purification method as set forth in claim 3, wherein said active oxygen release agent absorbs $NO_x$ in the exhaust gas when an air-fuel ratio of the exhaust gas flowing into the particulate filter is lean and releases the absorbed $NO_x$ when the air-fuel ratio of the exhaust gas flowing into the particulate filter becomes stoichiometric or rich.

7. An exhaust gas purification method as set forth in claim 1, wherein the amount of particulate removable by oxidation is a function of a temperature of the particulate filter.

8. An exhaust gas purification method as set forth in claim 7, wherein the amount of particulate removable by oxidation is further a function of at least one member selected from the group consisting of a concentration of oxygen and a concentration of $NO_x$ in the exhaust gas.

9. An exhaust gas purification method as set forth in claim 7, wherein the amount of discharged particulate removable by oxidation is stored in advance as a function of at least the temperature of the particulate filter.

10. An exhaust gas purification method as set forth in claim 1, wherein at least one member selected from the group consisting of the amount of discharged particulate and the amount of particulate removable by oxidation is controlled so that the amount of discharged particulate becomes smaller than the amount of particulate removable by oxidation when the amount of discharged particulate exceeds the amount of particulate removable by oxidation by at least a predetermined amount.

11. An exhaust gas purification method as set forth in claim 1, wherein the amount of discharged particulate is made smaller than the amount of particulate removable by oxidation by raising a temperature of the particulate filter.

12. An exhaust gas purification method as set forth in claim 1, wherein the amount of discharged particulate is made smaller than the amount of particulate removable by oxidation by reducing an amount of discharged particulate.

13. An exhaust gas purification method as set forth in claim 1, wherein the amount of discharged particulate is made smaller than the amount of particulate removable by oxidation by raising a concentration of oxygen in the exhaust gas.

14. An exhaust gas purification method as set forth in claim 1, further comprising absorbing $NO_x$ in the exhaust gas when an air-fuel ratio of the exhaust gas flowing into the particulate filter is lean and releasing the absorbed $NO_x$ when the air-fuel ratio of the exhaust gas flowing into the particulate filter becomes stoichiometric or rich.

15. An exhaust gas purification apparatus arranging in an engine exhaust passage a particulate filter for removing particulate in exhaust gas discharged from a combustion chamber, said particulate filter able to remove by oxidation any particulate in exhaust gas flowing into the particulate filter without emitting a luminous flame, said apparatus comprising:

a calculating means for calculating an amount of particulate that can be removed by oxidation on the particulate filter per unit time without emitting a luminous flame, and a control means for controlling at least one of the amount of discharged particulate or the amount of particulate removable by oxidation so that when an amount of the discharged particulate discharged from the combustion chamber per unit time is smaller than said amount of particulate removable by oxidation on the particulate filter per unit time, said filter removes said particulate removable by oxidation without emitting a luminous flame, and when the amount of discharged particulate exceeds said amount of particulate removable by oxidation the amount of discharged particulate becomes less than said amount of particulate removable by oxidation.

16. An exhaust gas purification apparatus as set forth in claim 15, wherein a precious metal catalyst is carried on the particulate filter.

17. An exhaust gas purification apparatus as set forth in claim 16, wherein said particulate filter carries an active oxygen release agent that takes in oxygen and holds the oxygen when excess oxygen is present in surroundings and releases the held oxygen in the form of active oxygen when a concentration of oxygen in the surroundings falls, and wherein when the particulate adheres on the particulate filter the active oxygen is released from the active oxygen release agent and the particulate adhered on the particulate filter is oxidized by the released active oxygen.

18. An exhaust gas purification apparatus as set forth in claim 17, wherein the active oxygen release agent is comprised of a member selected from the group consisting of an alkali metal, an alkali earth metal, a rare earth, and a transition metal.

19. An exhaust gas purification apparatus as set forth in claim 18, wherein the alkali metal and alkali earth metal are comprised of metals having a higher tendency toward ionization than calcium.

20. An exhaust gas purification apparatus as set forth in claim 17, wherein said active oxygen release agent absorbs $NO_x$ in the exhaust gas when an air-fuel ratio of the exhaust gas flowing into the particulate filter is lean and releases the absorbed $NO_x$ when the air-fuel ratio of the exhaust gas flowing into the particulate filter becomes stoichiometric or rich.

21. An exhaust gas purification apparatus as set forth in claim 15, wherein the amount of particulate removable by oxidation is a function of a temperature of the particulate filter.

22. An exhaust gas purification apparatus as set forth in claim 21, wherein the amount of particulate removable by oxidation is further a function of at least one member selected from the group consisting of a concentration of oxygen and a concentration of $NO_x$ in the exhaust gas.

23. An exhaust gas purification apparatus as set forth in claim 21, wherein the amount of discharged particulate removable by oxidation is stored in advance as a function of at least the temperature of the particulate filter.

24. An exhaust gas purification apparatus as set forth in claim 15, wherein said control means controls at least one member selected from the group consisting of the amount of discharged particulate and the amount of particulate removable by oxidation so that the amount of discharged particulate becomes smaller than the amount of particulate removable by oxidation when the amount of discharged particulate exceeds the amount of particulate removable by oxidation by at least a predetermined amount.

25. An exhaust gas purification apparatus as set forth in claim 15, wherein said control means makes the amount of discharged particulate smaller than the amount of particulate removable by oxidation by raising a temperature of the particulate filter.

26. An exhaust gas purification apparatus as set forth in claim 25, wherein said control means raises the temperature of the particulate filter by controlling at least one member selected from the group consisting of an amount of fuel injection and a fuel injection timing so that the temperature of the exhaust gas rises.

27. An exhaust gas purification apparatus as set forth in claim 26, wherein said control means raises the temperature of the particulate filter by retarding an injection timing of a main fuel or injecting auxiliary fuel in addition to the main fuel.

28. An exhaust gas purification apparatus as set forth in claim 25, further comprising an engine, wherein an amount of generation of soot gradually increases and peaks when an amount of exhaust gas recirculation increases and where almost no soot is generated any longer when the amount of exhaust gas recirculation further increases and wherein the control means raises the temperature of the exhaust gas and thereby raises the temperature of the particulate filter by making the amount of exhaust gas recirculation greater than the amount of exhaust gas recirculation where the amount of generation of soot peaks.

29. An exhaust gas purification apparatus as set forth in claim 25, further comprising a hydrocarbon feed device arranged in the exhaust passage upstream of the particulate filter and wherein the temperature of the particulate filter is raised by feeding hydrocarbon from the hydrocarbon feed device into the exhaust passage.

30. An exhaust gas purification apparatus as set forth in claim 25, further comprising an exhaust control valve arranged in the exhaust passage downstream of the particulate filter and wherein the temperature of the particulate filter is raised by closing the exhaust control valve.

31. An exhaust gas purification apparatus as set forth in claim 25, further comprising an exhaust turbocharger provided with a waist gate valve for controlling an amount of exhaust gas bypassing an exhaust turbine and wherein the waist gate valve is opened to raise the temperature of the particulate filter.

32. An exhaust gas purification apparatus as set forth in claim 25, wherein said control means makes the amount of discharged particulate smaller than said amount of particulate removable by oxidation by reducing the amount of discharged particulate.

33. An exhaust gas purification apparatus as set forth in claim 32, wherein said control means controls an amount of fuel injection, a fuel injection timing, a fuel injection pressure, or injection of auxiliary fuel so that the amount of discharged particulate is reduced.

34. An exhaust gas purification apparatus as set forth in claim 32, further comprising an exhaust supercharging means for supercharging an intake air and wherein said control means reduces the amount of discharged particulate by increasing a supercharging pressure.

35. An exhaust gas purification apparatus as set forth in claim 32, further comprising an exhaust gas recirculation device for recirculating exhaust gas in an intake passage and wherein said control means reduces the amount of discharged particulate by increasing an exhaust gas recirculation rate.

36. An exhaust gas purification apparatus as set forth in claim 15, wherein said control means makes the amount of discharged particulate smaller than said amount of particulate removable by oxidation by raising a concentration of oxygen in the exhaust gas.

37. An exhaust gas purification apparatus as set forth in claim 36, further comprising an exhaust gas recirculation device for recirculating exhaust gas in an intake passage and wherein said control means raises the concentration of oxygen in the exhaust gas by reducing an exhaust gas recirculation rate.

38. An exhaust gas purification apparatus as set forth in claim 36, further comprising a secondary air feed device for feeding secondary air into the exhaust passage upstream of the particulate filter and wherein said control means raises the concentration of oxygen in the exhaust gas by feeding secondary air into the exhaust passage upstream of the particulate filter.

39. An exhaust gas purification apparatus as set forth in claim 15, wherein has particulate filter has a function of absorbing $NO_x$ in the exhaust gas when an air-fuel ratio of the exhaust gas flowing into the particulate filter is lean and releasing the absorbed $NO_x$ when the air-fuel ratio of the exhaust gas flowing into the particulate filter becomes stoichiometric or rich.

* * * * *